United States Patent
Weiguo et al.

(10) Patent No.: US 7,330,584 B2
(45) Date of Patent: Feb. 12, 2008

(54) IMAGE PROCESSING APPARATUS AND METHOD

(75) Inventors: Wu Weiguo, Tokyo (JP); Takayuki Yoshigahara, Tokyo (JP); Sundar Vedula, Sunnyvale, CA (US); Ali Tabatabai, Cupertino, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 644 days.

(21) Appl. No.: 10/965,297

(22) Filed: Oct. 14, 2004

(65) Prior Publication Data

US 2006/0083421 A1   Apr. 20, 2006

(51) Int. Cl.
    *G06K 9/00* (2006.01)
(52) U.S. Cl. .............. 382/154; 382/165; 382/173; 382/291
(58) Field of Classification Search ......... 382/154, 382/165, 173, 282, 291, 190
    See application file for complete search history.

(56) References Cited

U.S. PATENT DOCUMENTS 5,867,591 A * 2/1999 Onda ................. 382/154
6,526,161 B1 * 2/2003 Yan .................. 382/118
7,227,526 B2 * 6/2007 Hildreth et al. ......... 345/156

* cited by examiner

Primary Examiner—Phuoc Tran
(74) Attorney, Agent, or Firm—Frommer Lawrence & Haug LLP; William S. Frommer; Thomas F. Presson

(57) ABSTRACT

An image processing apparatus and an image processing method, applied to e.g. a TV conference system or a TV telephone system, in which an image to be transmitted or received is captured and reconstructed into a virtual view point image which may appear as if it is captured by a virtual camera. The correspondence between pixels may be taken with higher robustness and higher accuracy, while mismatch in such correspondence, otherwise caused due to disparity, may be reduced to as small a value as possible. To this end, the disparity between the images, obtained on imaging an object from different view points by at least two cameras 11a, 12a, are detected and, based on the detected disparity, each of the images is separated into plural image regions. The relation of correspondence is found of the separated each image region, in association with the object, from one pixel position on the same horizontal lines to the next. From the pixel positions and the associated luminance components, for which the relation of correspondence has been found, a virtual view point image, to be generated by a virtual camera, mounted imaginarily, is constructed.

10 Claims, 16 Drawing Sheets

NORMALIZED IMAGE Pm1

NORMALIZED IMAGE Pm2

IMAGE DISTURBANCE

IMAGE PROCESSING APPARATUS AND METHOD

BACKGROUND OF THE INVENTION

1. Field of the Invention

This invention relates to an image processing apparatus and an image processing method, applied to e.g. a TV conference system or a TV telephone system, in which an image to be transmitted or received is captured and reconstructed into a virtual view point image which may appear as if it is captured by a virtual camera.

2. Description of Related Art

There has so far been proposed a system in which plural users may have remote dialog as they view the images of counterpart side users from remote places, as typified by a TV telephone system or a teleconference system. In such system, it is possible to demonstrate an image of a counterpart side user on a display, to pick up an image of a user viewing the display as an object of imaging and to send resulting image signals over a network, such as public switched telephone network or dedicated network, to an image processing apparatus of the counterpart side user, thereby imparting the on-the-spot feeling to both users.

In a conventional teleconference system, the user viewing the image of the counterpart side party, demonstrated in the vicinity of the center of the display, is imaged by a camera mounted on the top of the display. Hence, it is the image of the user bending his/her head slightly downward that is demonstrated on a display unit of the counterpart party. The result is that the dialog between the users is carried out as the lines of sight of the users are not directed to each other, thus imparting the uncomfortable feeling to both users.

Ideally, the dialog may be carried out as the lines of sight of the users are directed to each other, if the cameras are mounted in the vicinity of the display units adapted for demonstrating the images of the counterpart parties. However, it is physically difficult to install the camera in the vicinity of the center of the display.

For overcoming the problems that the lines of sight of the parties having a dialog are not coincident with one another, there has been proposed an image processing apparatus in which the three-dimensional information of an object is extracted based on input images captured by multiple cameras arranged on both sides of the display, an output image of the object is reconstructed responsive to the information pertinent to the view point position of the receiving party and the three-dimensional information as extracted to cause the output image to be demonstrated on a display of the counterpart user (see Patent Publication 1, as an example). In this image processing apparatus, a virtual view point camera image is synthesized at the center of the image surface, using an epipolar planar image generated from images of multi-cameras arranged on a straight line, such as to realize communication with high on-the-spot feeling, with the lines of sight of the users then coinciding with one another.

In order to have the parties to the TV conference look at one another, with the lines of sight of the users then coinciding with one another, an image communication apparatus has also been proposed in which the three-dimensional position information is generated on the basis of images picked up by two cameras placed on left and right sides of the image surface (see for example the Patent publication 2).

For reconstructing an output image of the object, as described above, the relation of correspondence between the respective images, obtained on imaging an object from different view points by at least two cameras, is found from one pixel position to another. The reason is that the object shape as well as the distance to the respective cameras may be found by the principle of triangulation and hence it becomes possible to generate a highly accurate virtual view point image, captured by a virtual camera imaginarily mounted in the vicinity of the display.

As a basic structure, the case of taking stereoscopic correspondence between two images, captured by two cameras mounted on the left and right sides of the image surface (screen), is explained by referring to FIG. 1.

If the image pickup operations are carried out with the two cameras, having the optical centers C1, C2, as the optical axes of the cameras are directed to a point M being imaged, from different view points, the normal vector p1, p2 of the images Ps1, Ps2, obtained on the image pickup surfaces of the cameras, point to different directions. That is, although the directions of straight lines, interconnecting the cameras and the point M, are coincident with the normal vector p1, p2 of the images Ps1, Ps2, obtained on the image pickup surfaces of the cameras, these normal vector point to different directions.

Meanwhile, the taking of correspondence is carried out by extracting the pixel positions and the luminance components at the same location, forming P as an object, in the images Ps1, Ps2, by way of coordinating the pixel positions and the luminance components at the same location. For example, a point of correspondence of a pixel m1 of the image Ps1 is on an epipolar line L1' of the image Ps2, such that, by searching on the line L1', a pixel m1', most analogous to the pixel m1, may be detected as a corresponding point. The object P in a three-dimensional space may readily be estimated by exploiting the so coordinated pixels m1, m1'.

As a concrete technique for taking the correspondence, pixel-based matching, area-based matching and feature-based matching, for example, have so far been proposed. The area-based matching is a method of directly searching a corresponding point of a pixel in one image in the other image (see for example the non-patent publication 1). The area-based matching is such a method consisting in searching a corresponding point of a pixel in one image in the other image by having reference to a local image pattern around the corresponding point (see for example the non-patent publications 2 and 3). In the feature-based matching, a variable density edge, for example, is extracted from the image, and only feature portions of the images are referenced for taking the correspondence (see for example the non-patent publications 4 and 5).

However, these techniques specify the strongly analogous pixels, out of the pixels lying on the epipolar line, as the corresponding points, so that coordination between the images Ps1, Ps2, obtained on picking up an image of the user as an object, is difficult to achieve in an area of a repetitive pattern, such as both eyes of the user, or a so-called non-feature point where there scarcely occur changes in luminance, such as wall portion, as shown in FIG. 2.

On the other hand, in the images Ps1, Ps2, obtained on imaging from different view points, the displayed contents differ in cheeks or ears, shown in FIG. 2, due to the disparity ascribable to the separation between the object and the camera. These areas are referred to below as occlusion areas. In these occlusion areas, the corresponding point of the object, demonstrated on one Ps1 of the images, is hidden in the other image Ps2, thus giving rise to inconvenience in taking the correspondence.

Moreover, the images Ps1, Ps2, obtained on capturing from different view points, exhibit differential luminance or chroma components, in e.g. an area differing in brightness depending on the viewing direction, such as a window portion, or an area producing regular reflection, such as the nose of the user, with the result that the coordination is difficult to achieve in these areas.

For taking the correspondence between these images flexibly and robustly, a variety of techniques, based on global optimization, have so far been proposed. The method for image-to-image matching, by the dynamic programming method, is taught in, for example, the non-patent publications 6 and 7. This image-to-image matching method teaches that the aforementioned problem of the object with only small changes in texture or of the repetitive matching can be successfully coped with by coordination or extension/contraction matching between the feature points.

[Patent publication 1] Japanese Patent Application Laid-Open No. 2001-52177

[Patent publication 2] Japanese Patent Application Laid-Open No. 2002-300602

[Non-patent publication 1] C. Lawrence Zitnick and Jon A. Webb: Multi-Baseline Stereo Using Surface Extraction, Technical Report, CMU-CS-96-196 (1966)

[Non-patent publication 2] Okutomi. M and Kanade. T: A locally adaptive window for signal matching. Int. Journal of Computer Vision, 7(2), pp. 143-162 (1992)

[Non-patent publication 3] Okutomi. M and Kanade. T: Stereo matching exploiting plural base line lengths, Journal of Electronic Information Communication Soc. D-11, Vol. J175-D-11, No. 8, pp. 1317-1327, (1992)

[Non-patent publication 4] H. Baker and T. Binford: Depth from edge and intensity based stereo, In Proc. IJCAI' 81 (1981)

[Non-patent publication 5] W. E. L Grimson: Computational experiments with a feature based stereo algorithm, IEEE. Trans. PAMI. Vol. 7, No. 1, pp. 17 to 34, 1985

[Non-patent publication 6] Ohta Y and Kanade T.: Stereo by intra- and inter-scanline search using dynamic programming, IEEE PAMI-7(2), 139-154, 1985

[Non-patent publication 7] Cox I. J et al.: A Maximum likelihood stereo algorithm, Computer Vision and Image Understanding, 63(3), 542-567, 1966.

Meanwhile, in the above-described image-to-image matching, there are occasions where the face position and the hand position of the user differ with respect to the image pickup surface of the camera. In particular, some users perform body or hand gestures in having a dialog, so that, even in such case, accuracy in coordination needs to be improved.

However, since the face position and the hand position of the user are presented as disparities in the images Ps1, Ps2, obtained on capturing from different view points, there is room for improvement, particularly in connection with accuracy in coordination, such that it is not possible to reduce the mismatch between the images for all image patterns.

SUMMARY OF THE INVENTION

In view of the above depicted status of the art, it is an object of the present invention to provide a method and an apparatus for image processing in which all pixels on the scan lines of the respective images, obtained from the respective cameras, are subjected to dynamic correspondence taking (companding matching) whereby correspondence between the images may be taken with improved robustness and accuracy and the mismatch otherwise produced in such correspondence may be reduced to as small a value as possible.

In one aspect, the present invention provides an image processing apparatus including:

disparity detection means for detecting the disparity between images obtained on imaging an object by at least two cameras from different view points;

image region separating means for separating each image into plural image regions, based on the disparity detected by the disparity detection means;

matching means for finding the relation of correspondence of the image regions, separated by the image separating means, as the image regions are coordinated with the object, from one pixel position on the same horizontal line to another; and image generating means for finding pixel positions, forming a virtual view point image, to be generated by a virtual camera, mounted imaginarily, and luminance components thereof, from pixel positions coordinated with one another by the matching means, and luminance components thereof;

the matching means comparing the luminance components and chroma components, for each pixel position, the relation of correspondence of which is to be found, to calculate the matching score, the matching means finding the relation of correspondence, responsive to the matching score as calculated, to discriminate the disparity between the images of the object.

In another aspect, the present invention provides an image processing method including:

a disparity detection step of detecting the disparity between images obtained on imaging an object by at least two cameras from different view points;

an image region separating step of separating each of the images into plural image regions, based on the disparity detected in the disparity detection step;

a matching step of finding the relation of correspondence of the image regions, separated in the image region separating step, as the image regions are coordinated with the object, from one pixel position on the same horizontal line to another; and an image generating step of finding pixel positions, forming a virtual view point image, to be generated by a virtual camera, mounted imaginarily, and luminance components thereof, from pixel positions coordinated with one another in the matching step, and luminance components thereof;

the matching step comparing the luminance components and chroma components, for each pixel position, the relation of correspondence of which is to be found, to calculate the matching score, the matching step finding the relation of correspondence, responsive to the matching score as calculated, to discriminate the disparity between the images of the object.

According to the present invention, since all of the pixels on the scan lines of the respective images, obtained from the respective cameras, are subjected to dynamic correspondence taking (companding matching), the correspondence between the images may be taken with improved robustness and accuracy. In addition, the mismatch otherwise produced in such correspondence taking may be reduced to the smallest value possible. Hence, by applying the technique to e.g. the TV conference system, the virtual view point image of higher image quality may be transmitted to the counterpart side.

DESCRIPTION OF THE PREFERRED EMBODIMENTS

Figure 1:
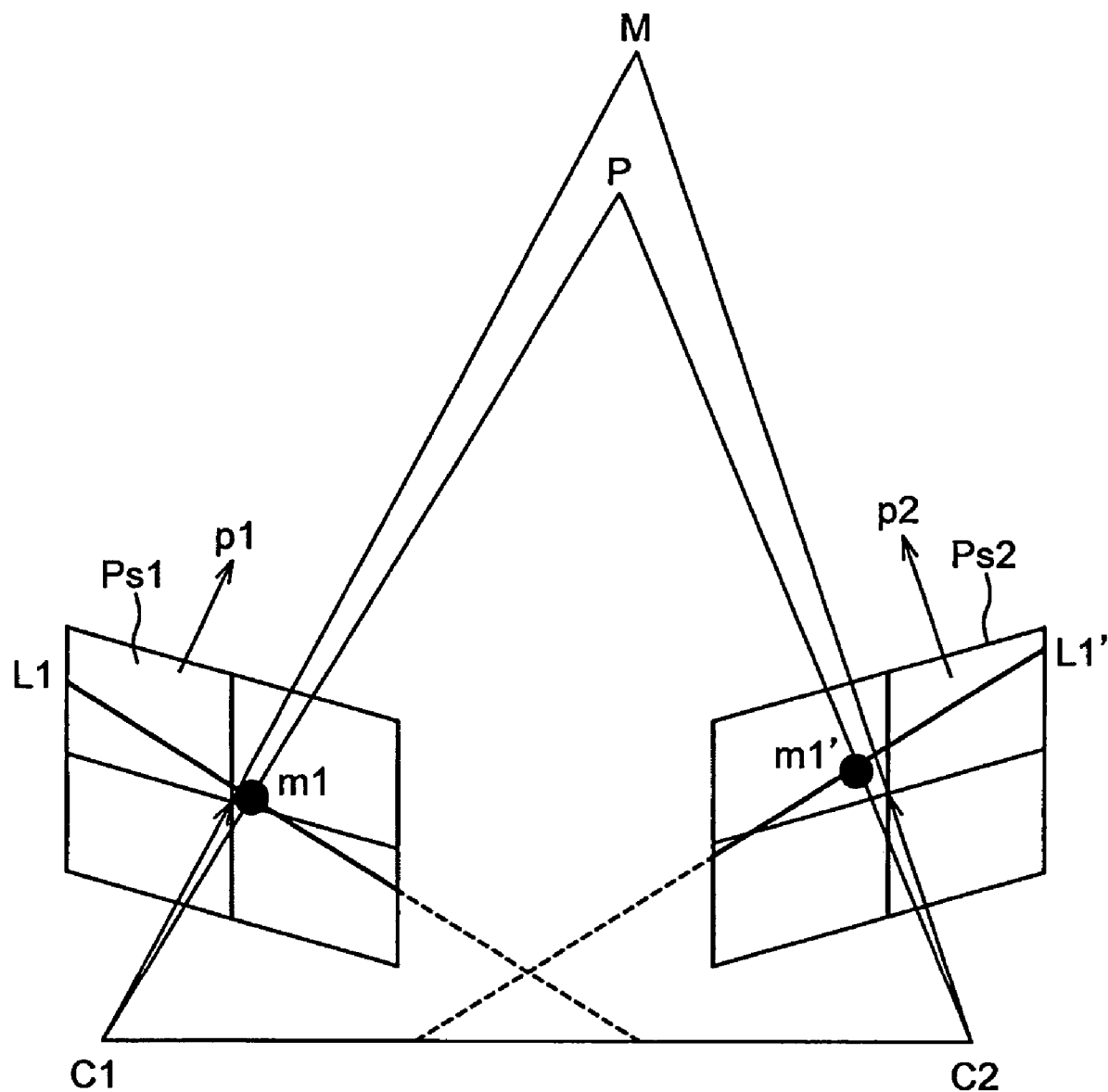
FIG. 1 illustrates the case of taking the correspondence in the stereoscopy between the images captured by two cameras mounted on the left and right sides of an image surface.
Figure 2:
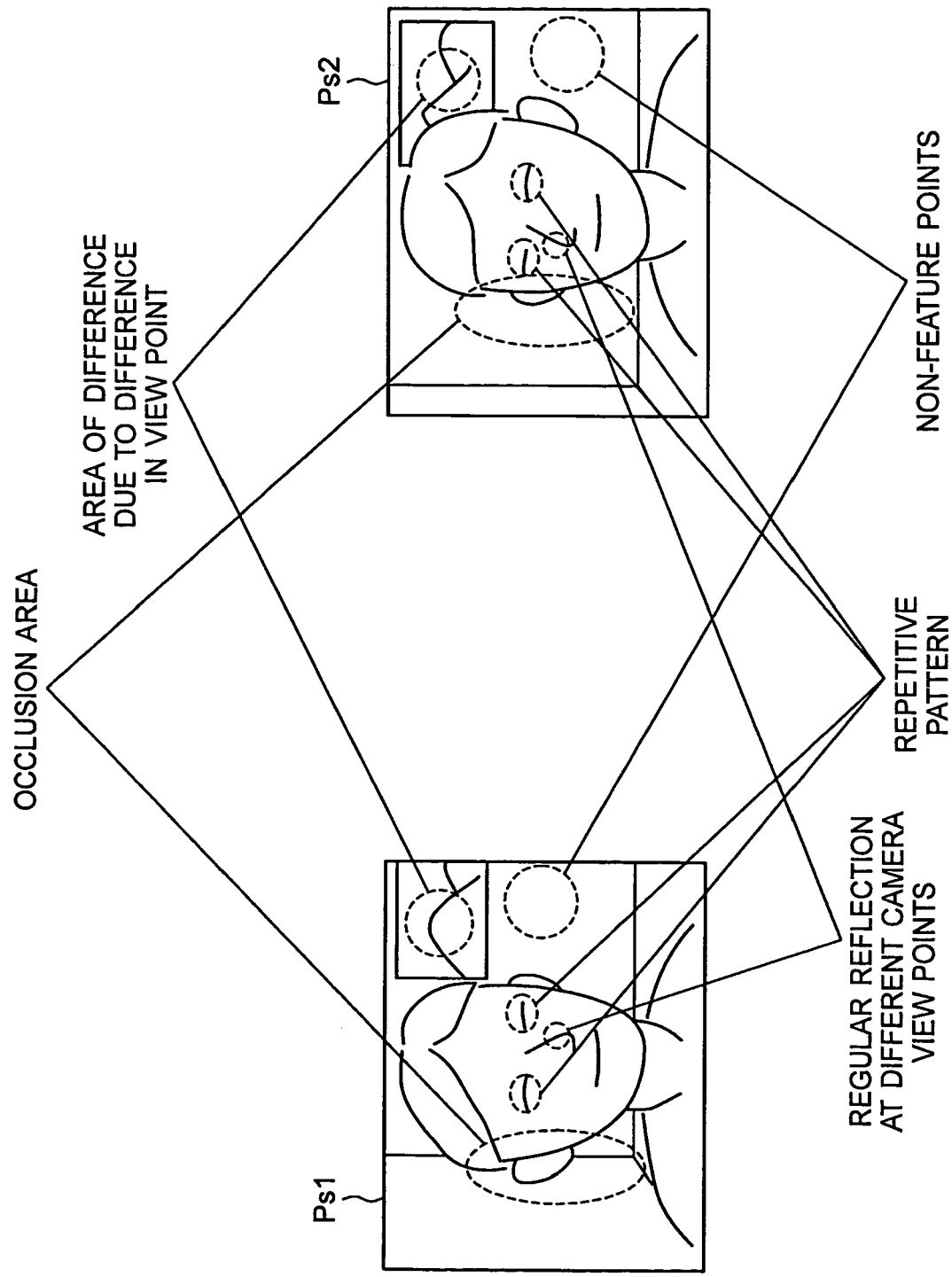
FIG. 2 illustrates a problem in the prior art.

Referring now to the drawings, the best mode for carrying out the present invention is explained in detail.

Figure 3:
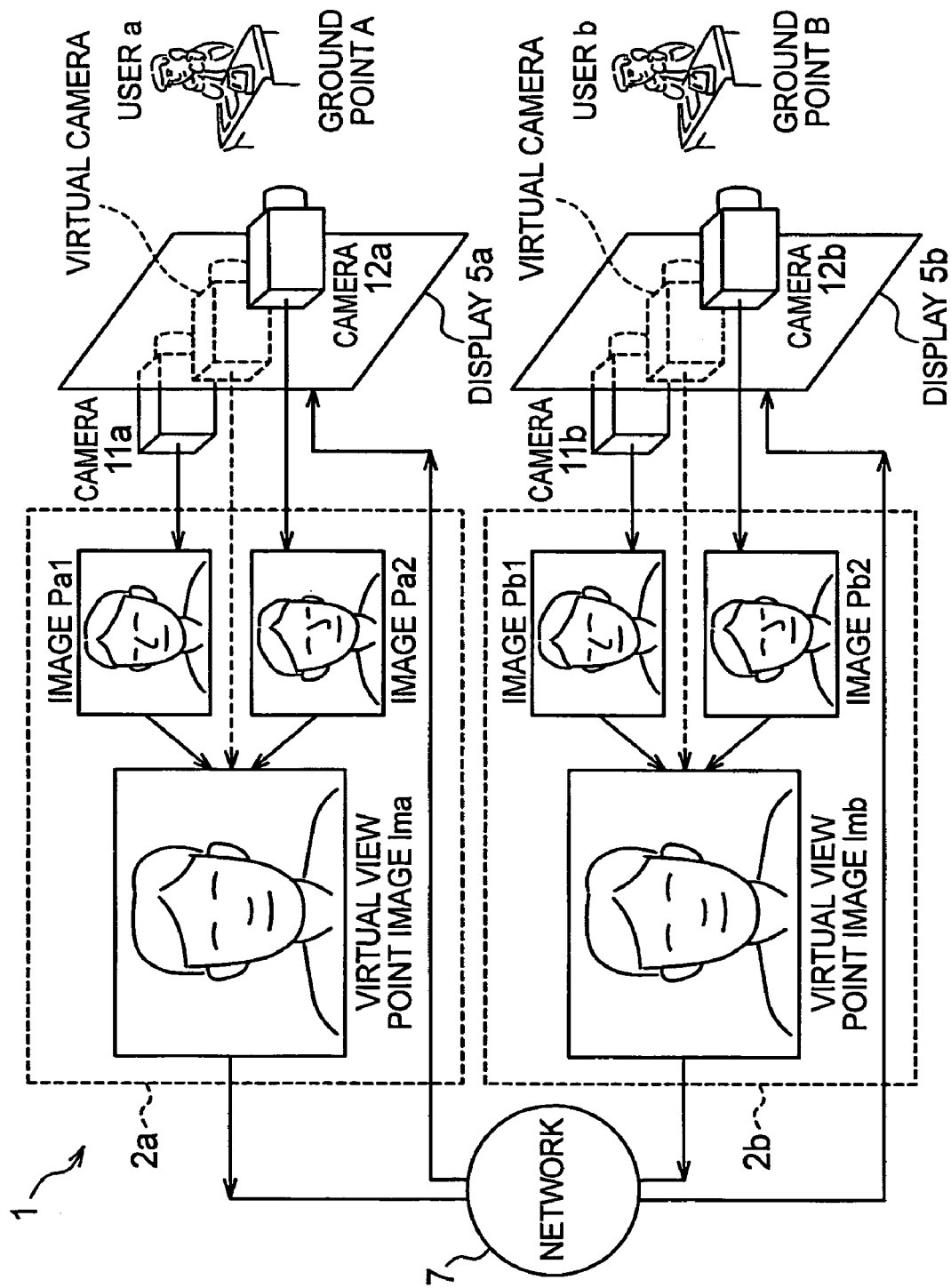
FIG. 3 shows schematics of a communication system embodying the present invention.

A communication system 1, according to the present invention, is such a system in which remote dialog is had between a user a at a ground point A and another user b at a ground point B, as an image of the counterpart user a or b is viewed from a distant site, as shown for example in FIG. 3.

At the ground point A, there are provided cameras 11a, 12a for imaging the user a, as an object of imaging, from respective different view points, a display 5a for displaying the image of the user b, as captured at the ground point B, for the user a, and an image processing device 2a for generating a virtual view point image Ima, based on images Pa1, Pa2, captured by the cameras 11a, 12a, and for sending the virtual view point image Ima over a network 7 to the ground point B.

At the ground point B, there are provided cameras 11b, 12b for imaging the user b, as the object of imaging, from respective different view points, a display 5b for displaying the image of the user a, as captured at the ground point A, for the user b, and an image processing device 2b for generating a virtual view point image Imb, based on images Pb1, Pb2, captured by the cameras 11b, 12b, and for sending the virtual view point image Imb over a network 7 to the ground point A.

It is noted that the virtual view point images Ima, Imb, generated by the image processing devices 2a, 2b, respectively, are equivalent to the images captured by virtual cameras mounted in the vicinity of the center of the displays 5a, 5b demonstrating the images of the counterpart user.

The cameras 11a, 11b are mounted on the left hand sides of the displays 5a, 5b, as viewed from the users a, b, respectively, while the cameras 12a, 12b are mounted on the right hand sides of the displays, as viewed from the users a, b, respectively. Although the cameras 11, 12 are mounted with the fixed capturing direction and with the fixed capturing image angle, the direction or the angle may be freely changed, based on the information as entered from the users a, b. Meanwhile, the communication system 1 is now explained below taking an exemplary case of imaging an object by two cameras mounted in keeping with the height of the line of sight of the user.

The displays 5a, 5b display the images, correspondence to the virtual view point image Ima, Imb, supplied from the counterpart ground points over the network 7, on e.g. respective liquid crystal display surfaces. These liquid crystal display surfaces are each made up by numerous liquid crystal display devices, which are optically modulated, responsive to output signals corresponding to the virtual view point images Ima, Imb, to generate images to be displayed for the users.

The image processing devices 2a, 2b are usually made up by electronic equipment, such as personal computers (PCs). These image processing devices 2a, 2b are provided with the functions for communicating with each other over the network 7, and transmit images or speech responsive to requests from the counterpart party. Meanwhile, the configuration of the image processing devices 2a, 2b will be explained in detail subsequently.

The network 7 is a public switched communication network, which has enabled the bidirectional transmission/reception of the information, such as the ISDN (Integrated Services Digital Network)/B(broadband)-ISDN, connected to a TA/modem, to say nothing of the Internet network connected to e.g. the image processing device 2 over the telephone network. Meanwhile, if this communication system 1 is used in a preset narrow area, the network 7 may be formed by LAN (Local Area Network). Meanwhile, in case the network 7 transmits moving pictures, such moving pictures, including e.g. the MPEG (Moving Picture Experts Group) data, first and foremost, are transmitted continuously from a given sole channel, based on the Internet protocol (IP). In transmitting still pictures, these still pictures are transmitted at a preset time interval from a channel as distinct from the channel for transmitting moving pictures. A network server, not shown, may further be connected to the network 7. This network server, not shown, manages e.g. the Internet information and, responsive to a request by the image processing device 2, sends out the preset information stored in the network server itself.

Figure 4:
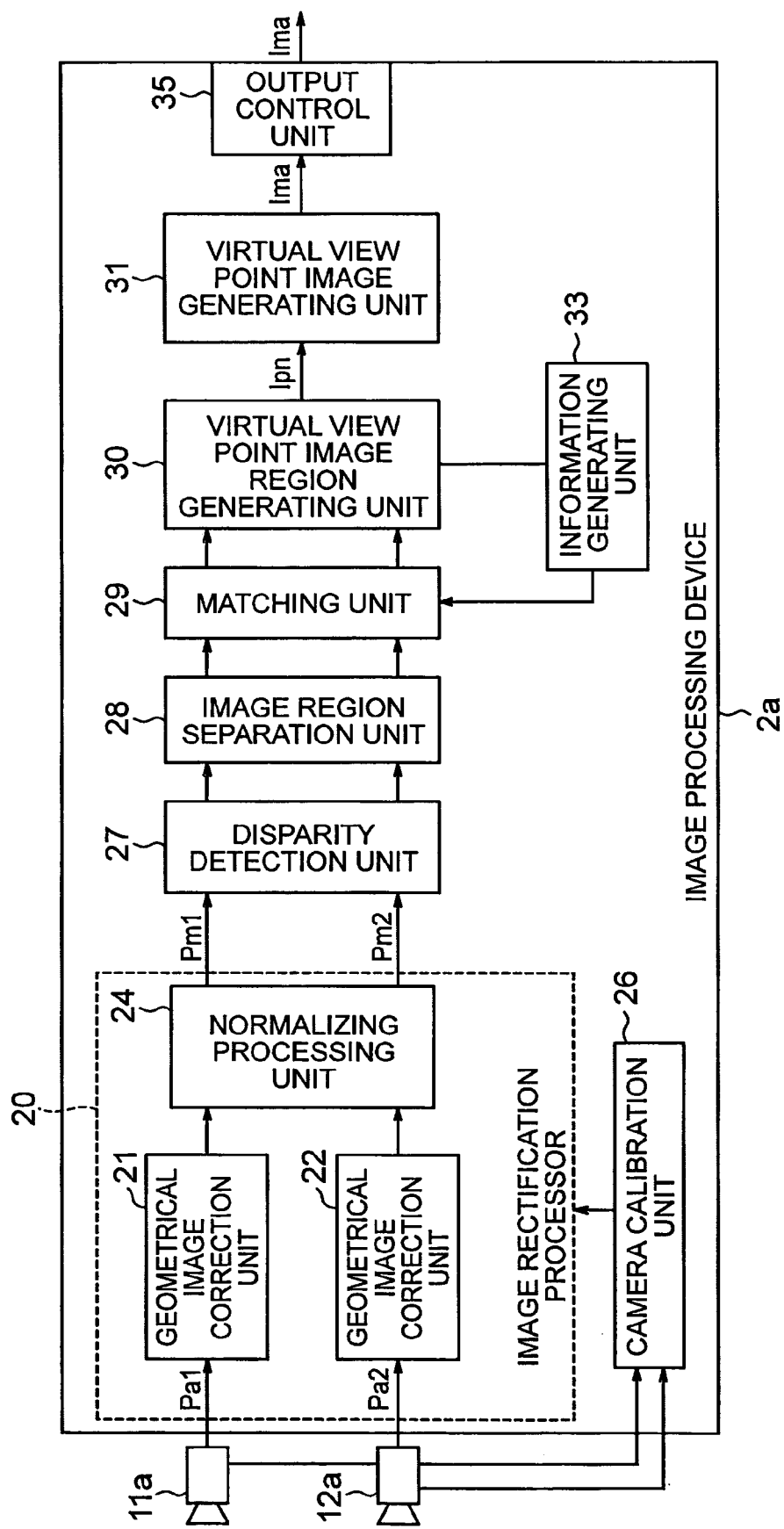
FIG. 4 illustrates the structure of an image processing apparatus.

The structure of the image processing device 2 is now explained, taking the image processing device 2a as an example for explanation. Referring to FIG. 4, the image processing device 2a includes an image rectification processor 20, supplied with images Pa1, Pa2 by cameras 11a, 12a, connected thereto, respectively, a camera calibration unit 26, connected to the image rectification processor 20, and a disparity detection unit 27, similarly connected to the image rectification processor 20. The image processing device 2a also includes an image region separation unit 28, connected to the disparity detection unit 27, a matching unit 29, connected to the image region separation unit 28, a matching unit 29, connected to the image region separation unit 28, a virtual view point image region generating unit 30, connected to the matching unit 29, and an information generating unit 33, similarly connected to the matching point 29. The image processing device 2a further includes a virtual view point image generating unit 31, supplied with a virtual view point image region Ipn, generated by the virtual view point image region generating unit 30, and an output controller 35 for sending the virtual view point image Ima, generated by the virtual view point image generating unit 31, to the counterpart side terminal device 2b.

The image rectification processor 20 includes geometrical image correction units 21, 22, for carrying out geometrical image correction of the images Pa1, Pa2, supplied from the cameras 11a, 12a, respectively, and a normalizing processing unit 24 for normalizing the images processed with the image correction by the geometrical image correction units 21, 22.

The geometrical image correction units 21, 22 correct the images Pa1, Pa2, based on the control information, including the geometrical position relationships of the cameras 11a, 12a, transmitted from the camera calibration unit 26. The geometrical position relationships of the cameras 11a, 12a may also be present as parameters in the control information transmitted from the above-mentioned camera calibration unit 26. In case the imaging is carried out as the image pickup direction and/or the image pickup angle of the cameras 11a, 12a is changed, the camera calibration unit 26 may form the above-mentioned geometrical position relationships into parameters, which parameters may then be included into the control information in the camera calibration unit 26 in correcting the images. In this manner, the geometrical image correction units 21, 22 may correct the images in real-time in dependence upon the image pickup directions and/or the image pickup image angles of the cameras 11a, 12a.

It is similarly possible for the camera calibration unit 26 to form the color aberration or distortion or deviation in the optical axes in the respective lenses of the cameras 11a, 12a into parameters, based on the calibration technique disclosed e.g. in the Japanese Patent Application Laid-Open No. 2000-350239 or in the Japanese Patent Application Laid-Open No. H11-53549, and to transmit these parameters to the image rectification processor 20. In such case, the image rectification processor 20 performs projective transformation of the images from the cameras 11a, 12a, based on the acquired parameters, for matching the images from the cameras to a reference image. These images from the cameras 11a, 12a are similarly adjusted to each other as to e.g. luminance components, using a projective transformation matrix which will minimize luminance errors between the images.

The normalizing processing unit 24 is supplied with images, corrected by the geometrical image correction units 21, 22, to perform geometrical normalizing processing thereon. The normalizing processing unit 24 causes the normal vector of the images Pa1, Pa2, captured by the respective cameras, to be matched to each other. That is, the normalizing processing unit 24 normalizes the normal vector of the images Pa1, Pa2, as captured by the cameras 11a, 12a, by matching the normal vector of the images Pa1, Pa2 to the normal line direction of a virtual plane π, to generate normalized images Pm1, Pm2. In such case, the normalizing processing unit 24 finds a projective transformation matrix for projecting the images Pa1, Pa2, captured by the respective cameras 11a, 12a, on the virtual plane π, and causes the normal vector of the respective images to be matched to the normal vector of the virtual plane π.

In case so-called fixed view point cameras are used as the cameras 11a, 12a, it is possible for the camera calibration unit 26 to obtain the normal vector of the images Pa1, Pa2 at the outset. In case imaging is carried out as the image pickup directions and/or the image pickup image angles of the cameras 11a, 12a are changed, the camera calibration unit 26 may form the so acquired normal vector into parameters, which parameters may be included into the control information in normalizing the images. This enables flexible accommodation to the case where image pickup operations are carried out as the image pickup direction, for example, are sequentially changed depending on the positions of the users a and b.

Moreover, in the camera calibration unit 26, the above parameters may be stored in a ROM or RAM, not shown, so that the image rectification processor 20 is able to refer from time to time to the stored parameters, depending on the then prevailing states, to realize high-speed correction processing. Moreover, by finding the parameters every time the images Pa1, Pa2 are supplied from the cameras 11a, 12a, respectively, the camera calibration unit 26 is able to achieve correction processing of high accuracy in the geometrical image correction units 21, 22.

The disparity detection unit 27 is supplied with the normalized images Pm1, Pm2, normalized by the normalizing processing unit 24. The disparity detection unit 27 discriminates regions of large disparity from the normalized images Pm1, Pm2 supplied to indicate such effect to the image region separation unit 28.

The image region separation unit 28 separates the regions of large disparity, as indicated by the disparity detection unit 27, from the normalized images Pm1, Pm2. The image regions, separated by the image region separation unit 28, are sent to the matching unit 29.

The matching unit 29 is supplied with image regions separated in the image region separation unit 28. The matching unit 29 finds the relationship of correspondence of the respective pixel positions making up the so supplied image regions.

Figure 5:
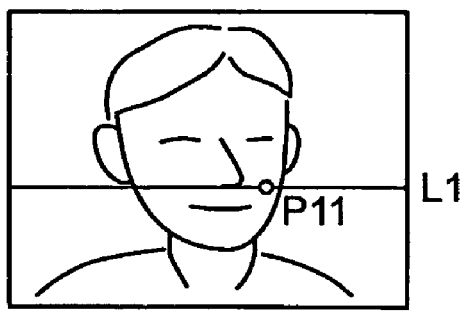
FIG. 5 illustrates the correspondence taking by a matching unit.
Figure 5:

For this correspondence taking, the pixel positions in the same location of the face of the user a and corresponding luminance components are extracted from the normalized images Pm1, Pm2. For example, as shown in FIG. 5, a point of correspondence of the pixel P11 on the scan line L1 of the normalized image Pm1 is on the scamming line L1' of the normalized image Pm2, so that, by searching on the line L1', the most analogous pixel position P11' may be detected as a point of correspondence. Meanwhile, the matching unit 29 may carry out this correspondence taking only for sites extracted as feature points, or for the totality of the pixels making up the normalized images Pm1, Pm2.

The information generating unit 33 generates the information necessary for finding the relationship of correspondence, from one pixel position to another, to send the so generated information to the matching unit 29. For generating the information on the relative position, the information generating unit 33 may discriminate the distance from the cameras 11a, 12a to the user a, as an object for imaging, in order to generate the corresponding disparity information. Such distance discrimination may be carried out by acquiring the 'Depth' information from the image information generated by the cameras 11a, 12a.

The information generating unit 33 may also generate the relative position information based on the view line direction of the user a relative to the display 50a. In such case, the information generating unit 30 acquires the view line direction (line-of-sight direction) of the user a from the images Pa1, Pa2, supplied from the cameras 11a, 12a, respectively, to generated the relative position information, whereby it is possible to realize the effect as if the image pickup direction of a virtual camera is matched to the view-line direction of the user a.

The virtual view point image region generating unit 30 is supplied with image regions matched by the matching unit 29. The virtual view point image region generating unit 30 generates a virtual view point image region Ipn, as later explained, based on the image region supplied, to send the so generated region to a virtual view point image generating unit 31.

The virtual view point image generating unit 31 is supplied with pixel positions, matched to one another in the matching unit 29, and with corresponding luminance components. The virtual view point image generating unit 31 also creates a virtual view point image Ima, by pasting a virtual view point image region Ipn, generated by the virtual view point image region generating unit 30. At this time, the virtual view point image generating unit 31 finds, based on the pixel positions and the corresponding luminance components, coordinated with each other, the pixel positions and the correspondence luminance components, which should form a new virtual view point image Ima, responsive to the relative position information generated by the information generating unit 33. The virtual view point image region generating unit 30 sends out the virtual view point image Ima, formed by the pixel position thus found out and the corresponding luminance components, to the output controller 35.

The output controller 35 manages control to send out the virtual view point image Ima, supplied thereto, over the network 7 to the image processing device 2b. The output controller 35 may also manage control to send out the images Pa1, Pa2, generated by the cameras 11a, 12a, alone to the image processing device 2b.

The specified operation in this image processing device 2a is now explained in detail.

The user a, as an object for imaging, is captured by the cameras 11a, 12a from respective different view points. As a result, the view line direction, face orientation and so forth of the user a on the images Pa1, Pa2, generated by the cameras 11a, 12a, are in respective different states. These images Pa1, Pa2 are supplied to the geometrical image correction units 21, 22 and are corrected so as to be free from image distortions or offset image center, based on parameters, such as lens distortions or image center positions of the cameras 11a, 12a, as found at the outset by the camera calibration unit 26.

When supplied to the normalizing processing unit 24, the images Pa1, Pa2, corrected by the geometrical image correction units 21, 22, are normalized by a method as now explained.

Figure 6:
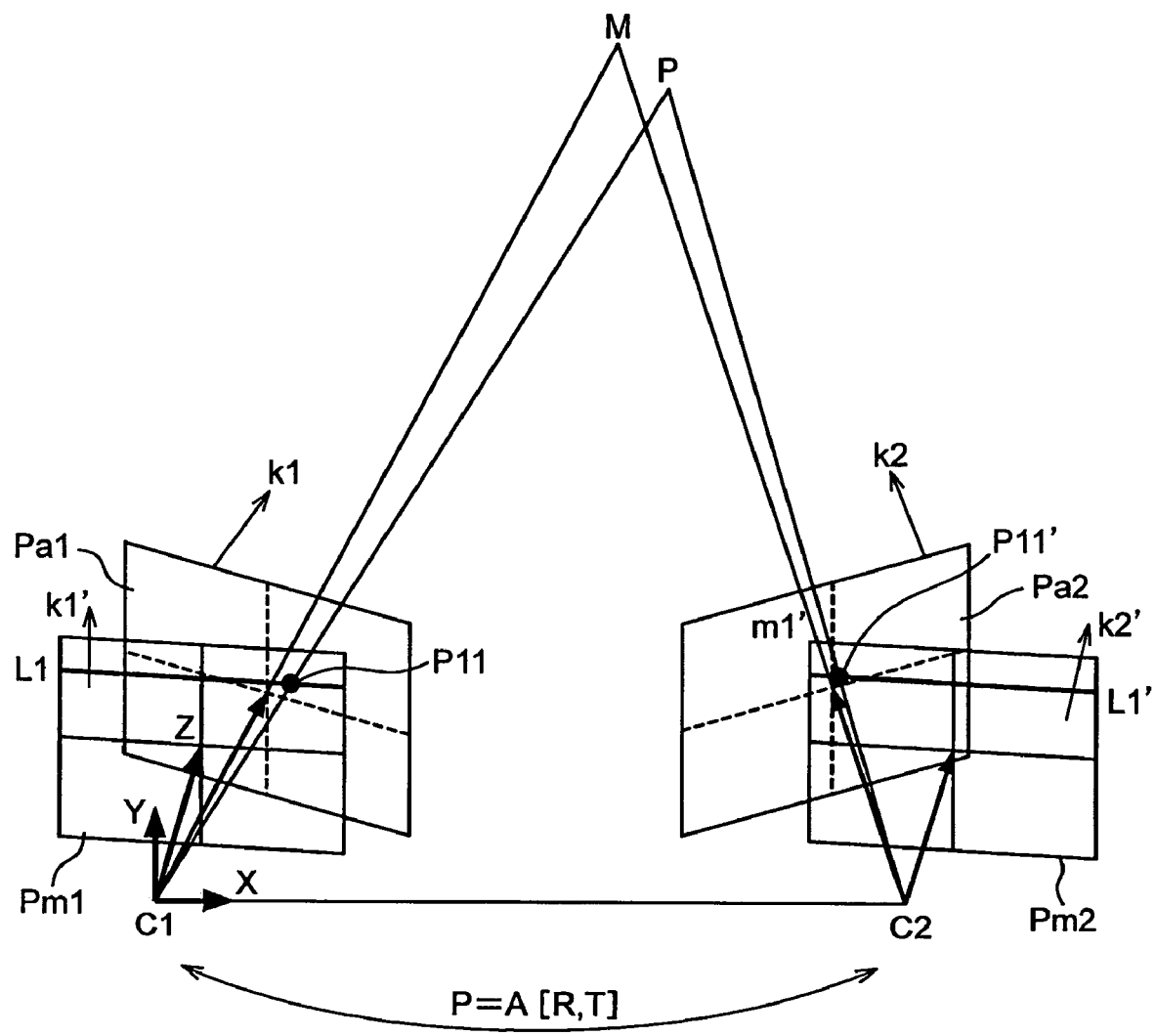
FIG. 6 Rectification: illustrates the normalization of matching the directions of the normal lines of images Pa1 and Pa2.

FIG. 6 shows a case of normalizing the images Pa1, Pa2 as captured by the respective cameras 11a, 12a. If imaging is carried out as the optical axes of the cameras 11a, 12a are tuned to a point M of the object for imaging, from respective different view points, by optical centers C1, C2 of the cameras 11a, 12a, the normal vector k1, k2 of the images Pa1, Pa2, obtained on the image pickup surfaces of the respective cameras 11a, 12a, point to respective different directions. That is, even though the directions of the straight lines, interconnecting the cameras 11a, 12a and the point M, are coincident with the normal vector k1, k2 of the images Pa1, Pa2, captured by the cameras, the normal vector k1, k2 of the images Pa1, Pa2 point to respective different directions. By subjecting the images Pa1, Pa2 to geometrical normalizing processing, it is possible to generate normalized images Pm1, Pm2, having image surfaces parallel to each other, and also having normal vector k1', k2' pointing to the same direction.

This geometrical normalizing processing is achieved by estimating inner camera parameters A1, A2, rotational matrixes R1, R2 and transposed matrixes T1, T2, using projected matrixes P1, P2, as found at the outset by the camera calibration unit 26, as a result of which normalized images Pm1, Pm2, having the normal vector k1', k2' of the as-corrected image pickup surfaces extending parallel to each other, may be produced.

Meanwhile, in effecting the geometrical normalizing processing, it is possible to set a virtual plane $\pi$, containing the optical centers C1, C2, and to use the projected matrixes P1, P2 for normalization, so that the normal vector of the normalized images Pm1, Pm2 point to the same direction as the normal line direction of this virtual plane $\pi$.

Figure 7:
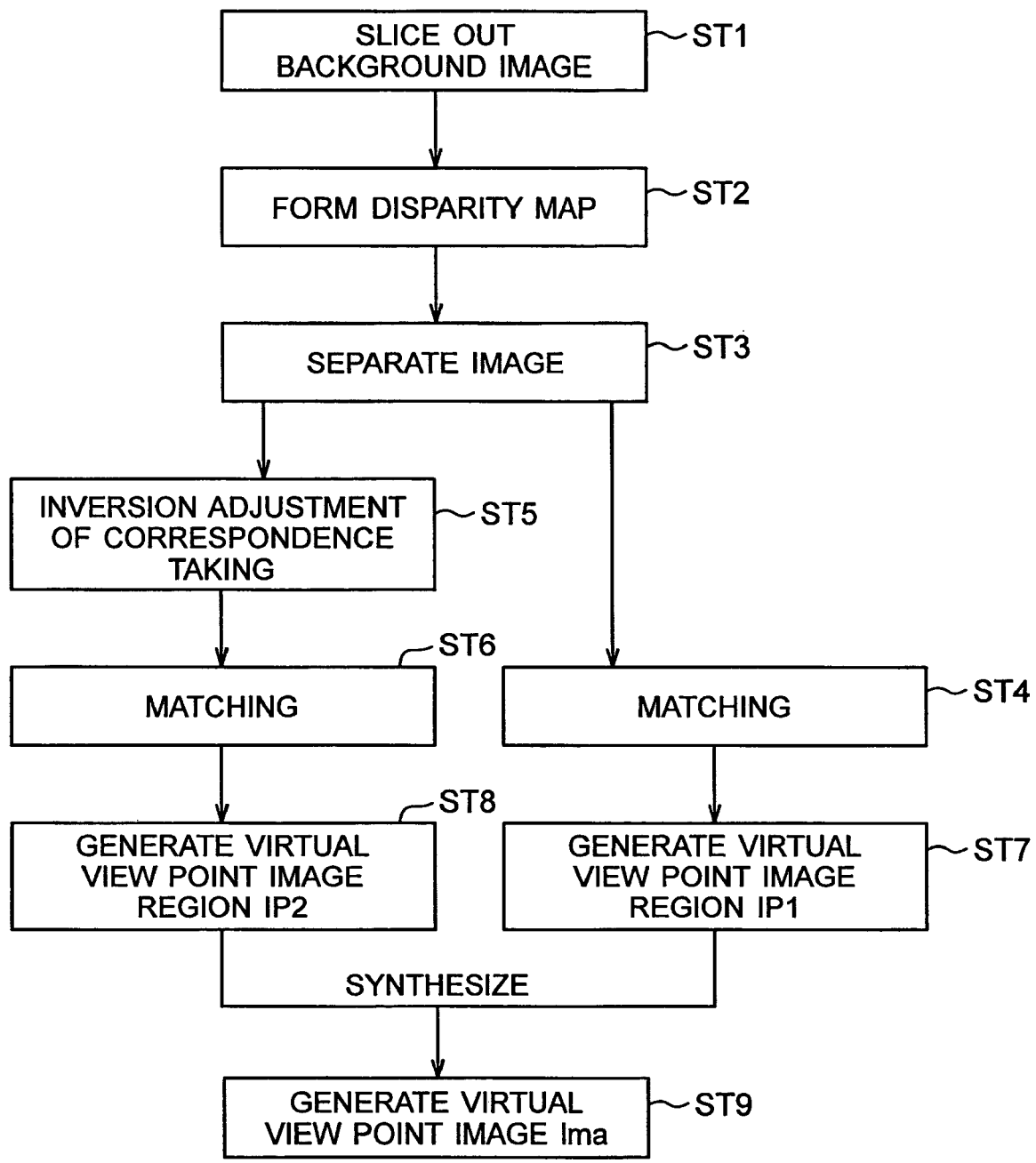
FIG. 7 depicts a flowchart showing the operation of the image processing apparatus embodying the present invention.

The normalized images Pm1, Pm2, subjected to the projective transformation in the normalizing processing unit 24 as described above, are sent to the disparity detection unit 27. When the normalized images Pm1, Pm2 have been sent to the disparity detection unit 27, processing progresses as indicated in the flowchart shown in FIG. 7.

Figure 8:
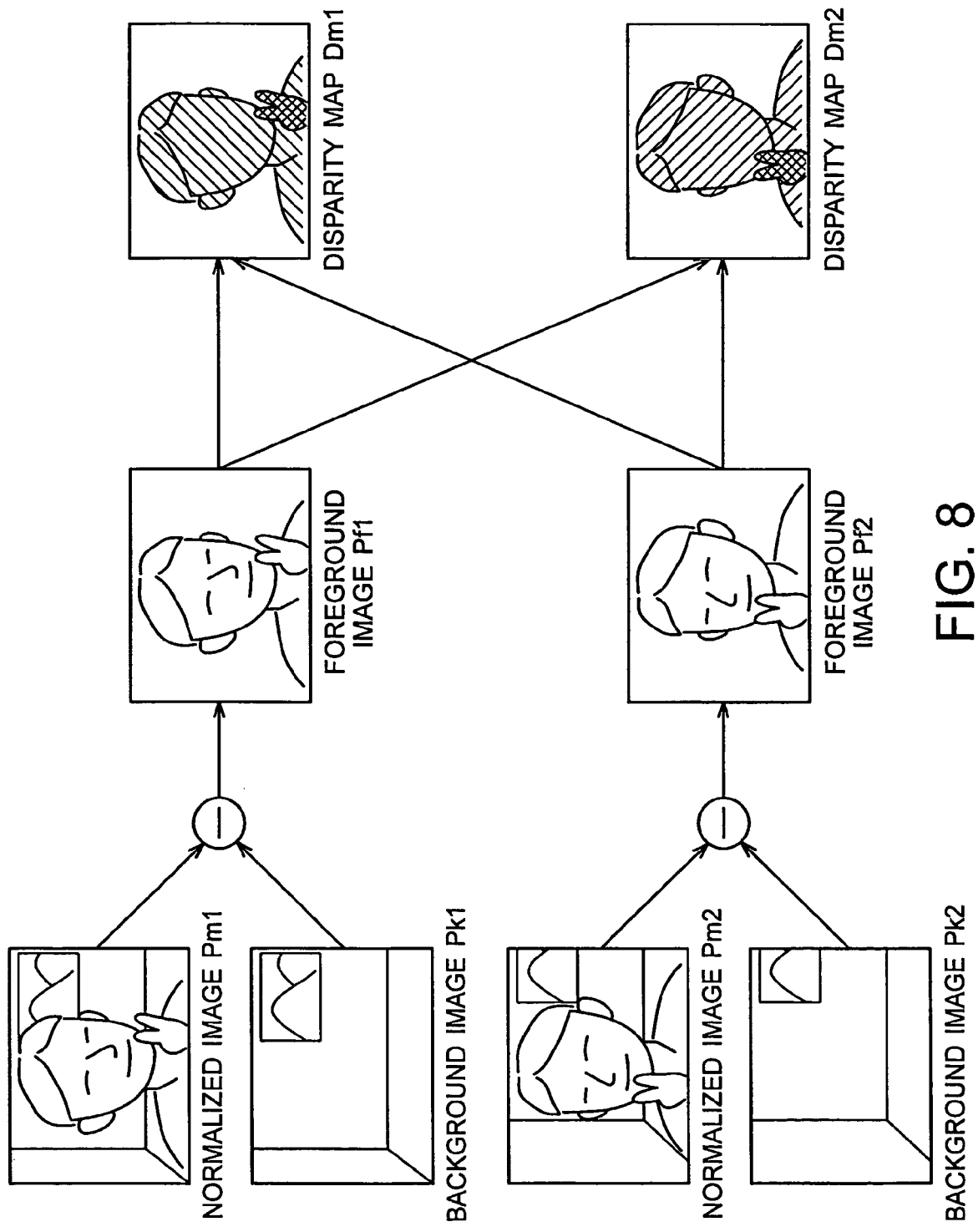
FIG. 8 shows the sequence of operations for estimating a depth map.

First, in a step ST1, background images are sliced out from the normalized images Pm1, Pm2. When the background images Pk1, Pk2 have been sliced out from the normalized images Pm1, Pm2, it is possible to acquire foreground images Pf1, Pf2, correspondence to image regions showing only the user a, as shown in FIG. 8. The image regions, each showing only the user a, may then be subjected to matching processing, as later explained, thereby effecting more efficacious matching processing with the alleviated effect emanating from the background image.

Then, processing transfers to a step ST2 to estimate a depth map based on the so sliced out foreground images Pf1 Pf2. In estimating the depth map, area base matching, employing a mask and a shift window of an area of the user a, may for example, be used. As a result, depth maps Dm1, Dm2, in which an image region indicating the face of the user a and an image region indicating the hand of the same user are colored differently, as shown in FIG. 8, may be produced.

Figure 9:
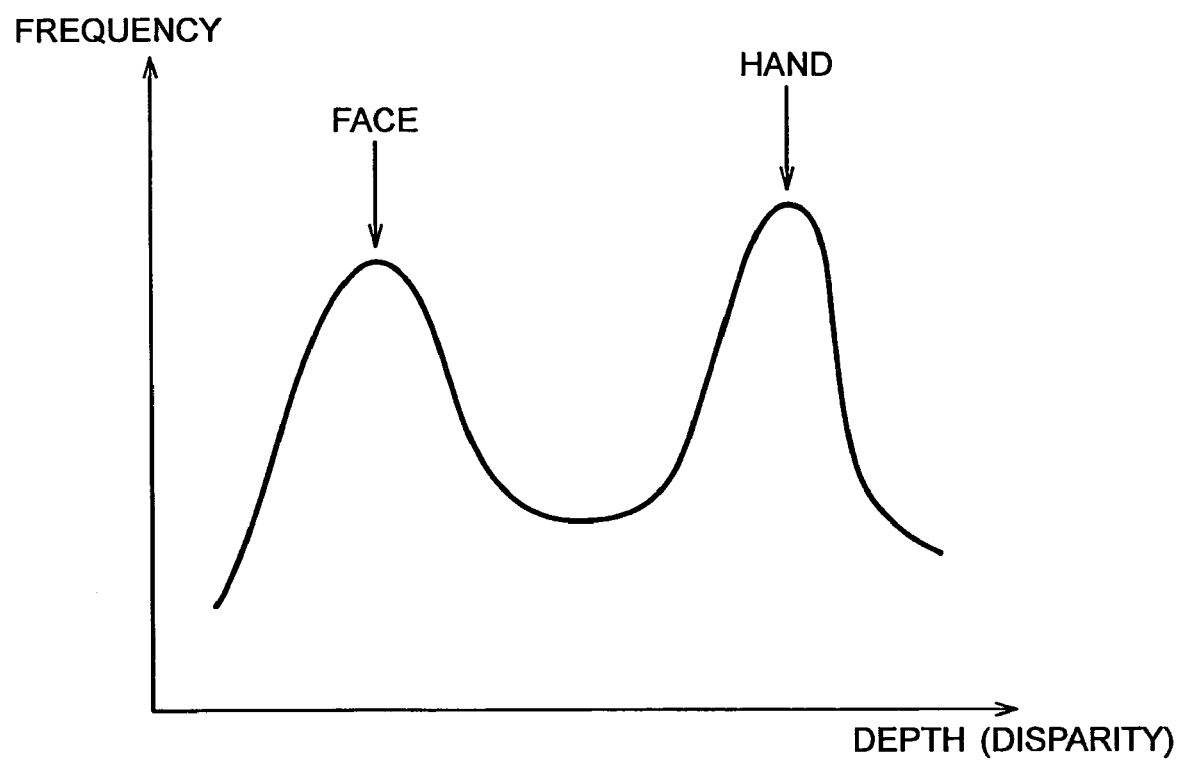
FIG. 9 is a graph showing the frequency against the depth (disparity) in a user a. (Histogram of Depth Map)

FIG. 9 shows the relationship of the frequency to the disparity (depth) of the user a as indicated by the foreground image Pf. As shown in FIG. 9, the frequency tends to be increased at the face and hand areas of the user a. By extracting these areas, the depth maps Dm1, Dm2, colored as shown in FIG. 8, may be generated.

After estimating the depth map in this step ST2, processing transfers to a step ST3.

Figure 10:
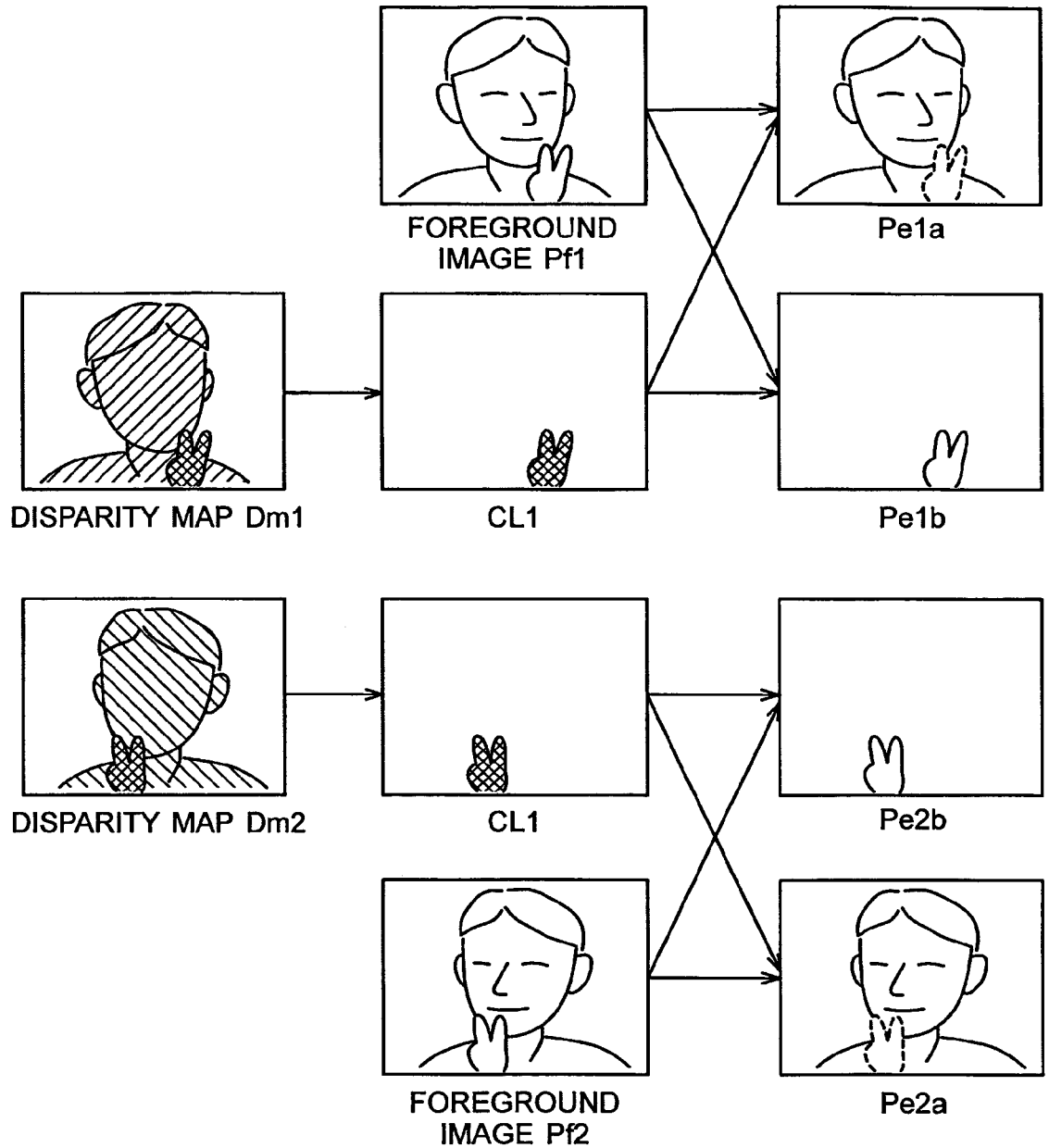
FIG. 10 illustrates a method for separating an image.

In this step ST3, image separation is carried out, in the image region separation unit 28, by a method as hereinafter explained. The image region separation unit 28 refers to the depth maps Dm1, Dm2, generated in the step ST2, to specify image regions CL1, CL2, indicating the hand of the user a, as shown in FIG. 10.

The image region separation unit 28 then slices out images Pe1b, Pe2b, derived from these image regions CL1, CL2, from the foreground images Pf1 Pf2, respectively. Since the images Pe1b, Pe2b have now been sliced out, images Pe1a, Pe2a are newly generated.

Then, processing transfers to a step ST4, where the images Pe1a, Pe2a, separated in the step ST3, are subjected to matching processing in the matching unit 29. In this matching processing, the images Pe1a, Pe2a are coordinated with each other, from one pixel position to the next, by way of correspondence taking, as the images are coordinated with the object of imaging, in the matching unit 29. Since the images are pre-normalized in the normalizing processing unit 24, provided upstream of the matching unit 29, and epipolar lines are rendered parallel to each other, it is possible to provide for robustness in pixel searching.

In case the images Pe1a, Pe2a are coordinated to each other in the matching unit 29, a pixel P11 on the scan line L1 has a corresponding point on the scan line L1', such that the pixel P11' as a corresponding point may be detected by searching on the scan line L1'.

In case a pixel on the scan line L1 in the image Pe1a is to be associated with another pixel on the scan line L1' in the image Pe2a, by way of correspondence taking, with the images Pe1a, Pe2a both being an image of the user a, the points of a point string R1 of feature points on the scan line L1 are labeled (a1, a2, a3, a4, a5) beginning from the left side, while those of a point string R2 of feature points on the scan line L1 are labeled (b1, b2, b3, b4, b5) equally beginning from the left side. If the feature points of the point strings R1, R2 on the scan lines L1, L1' are coordinated in relation to the object for imaging, byway of correspondence taking, the point a1 is coordinated with the feature point b1 on the line L1', so that there persists the 1:1 correspondence. However, the feature points a2, a3 forming the right ear of the user a, are associated with a feature point b2 on the line L1', so that there persists the 2:1 correspondence. In similar manner, the feature point a4, forming the left ear of the user a, is associated with the feature points b3, b4 on the scan line L1', so that the relationship of correspondence is 1:2. Meanwhile, the feature point a5 is associated with the feature point b5 on the scan line L1', so that the relationship of correspondence is 1:1.

Thus, in the images Pe1a, Pe2a, obtained on imaging from different view points, the contents displayed at e.g. an area of each ear of the user a differ due to the disparity caused by separation between the object and the camera. This area is termed an occlusion area. In such occlusion area, a corresponding point of an object displayed in one of the normalized images is hidden in the other normalized image, so that, with the usual coordination of {(a1, b1), (a2, b2), (a3, b3), (a4, b4), (a5, b5)}, there is produced an error.

Figure 11B:
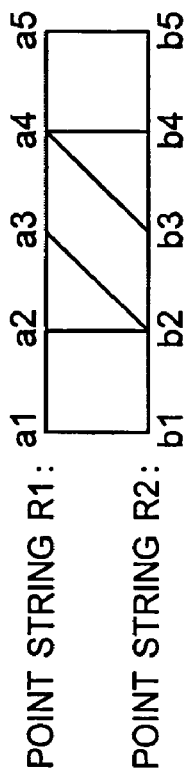
FIGS. 11(a) to 11(c) illustrate the correspondence taking exploiting the DP.
Figure 11C:
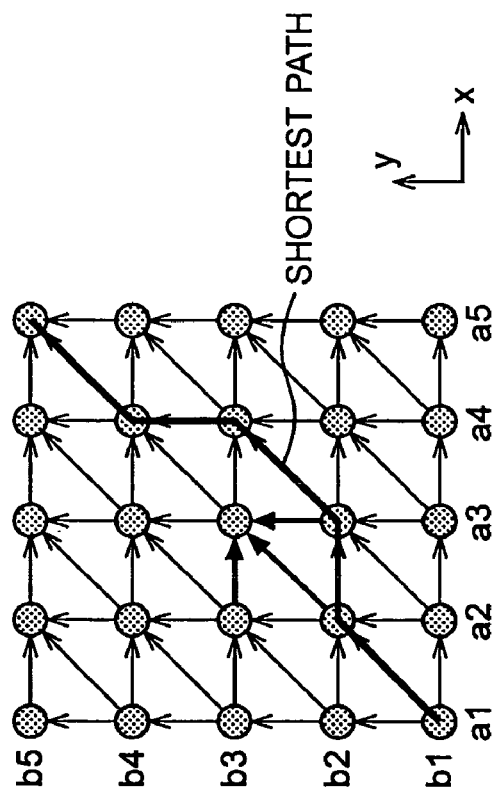
Figure 11A:
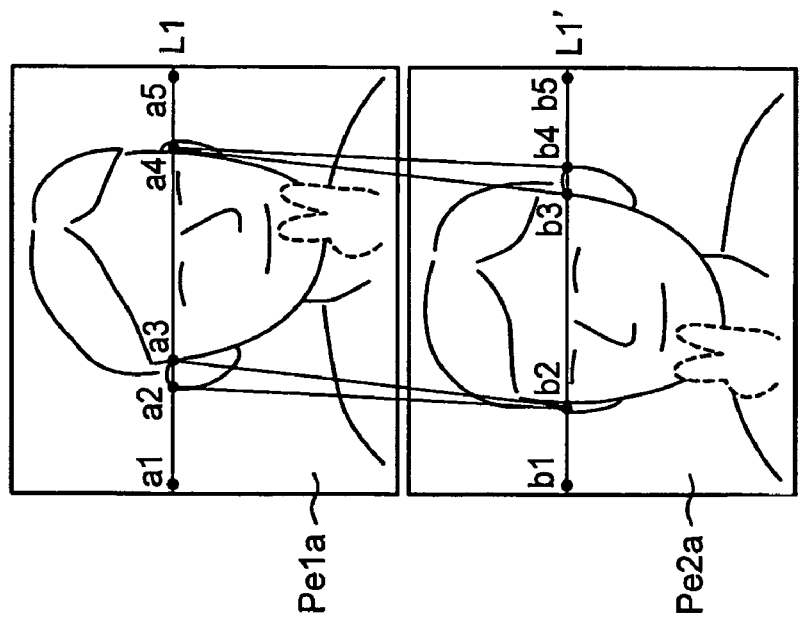

Thus, the matching unit 29 in the image processing device 2a of the present invention, discriminating the disparity, manages control so that the coordination of the feature points of the point strings R1, R2 of the normalized images, shown in FIG. 11(a), will ultimately be {(a1, b1), (a2, b2), (a3, b2), (a4, b3), (a4, b4), (a5, b5)}, as shown in FIG. 11(b).

Specifically, the totality of the pixels on the scan lines of the images Pe1a, Pe2a are dynamically coordinated by exploiting the dynamic programming (DP; shortest path search) shown in FIG. 11(c).

If the point string R1 of the feature points {a1, a2, a3, a4, a5} on the scan line L1 is arranged on the X axis, the point string R2 of the feature points {b1, b2, b3, b4, b5} on the scan line L1' is arranged on the Y axis, in FIG. 11(c), and the relationship of coordination shown in FIG. 11(b) is fitted to this graph, the path indicated by a thick line in FIG. 11(c) is formed. An interconnection of plural straight thick lines, each interconnecting the points of correspondence, is termed below an optimum path.

If the optimum path undergoes linear increase towards upper right, it indicates that, in coordinating the feature points on the scan lines L1, L1' in a direction from left towards right in the drawing, the feature points on these scan lines are sequentially shifted and coordinated in a 1:1 correspondence. As an example of the section of the optimum path, which undergoes the linear increase towards upper right side, the feature points are shifted from (a1, b1) on the scan lines L1, L1' one each from left to right, so that the feature points (a2, b2) are correctly coordinated with each other.

If the optimum path shifts in the horizontal direction, it indicates that, as a result of the disparity between the images Pe1a and Pe2a, the feature point, indicated in the image Pe1a, is hidden in the image Pe2a. In such case, a plural number of feature points on the image Pe2a are coordinated with a sole feature point on the image Pe1a. As an example of the section of the optimum path, which undergoes shift in the horizontal direction, the feature point b2, indicating the right ear of the user a, out of the feature points (a2, b2) on the scan lines L1, L1', is also associated with the feature point a3, due to the above-mentioned disparity, so that the feature point b is maintained and is associated with the feature point a3.

Moreover, if the optimum path undergoes shifting in the vertical direction, it indicates that, as a result of the disparity between the images Pe1a and Pe2a, the feature point, indicated in the image Pe2a, is hidden in the image Pe1a. In such case, a plural number of feature points on the image Pe2a are coordinated with a sole feature point on the image Pe1a. As an example of the section of the optimum path, which undergoes shifting in the vertical direction, the feature point a4, indicating the left ear of the user a, out of the feature points (a4, b3) on the scan lines L1, L1', is also associated with the feature point b4, due to the aforementioned disparity, so that the feature point a4 is maintained and is associated with the feature point b4.

The matching unit 29 effects this coordination between a large number of sets of the scan lines L1, L1', forming part or all of the images Pe1a, Pe2a, and correspondence is taken of the feature points of the point strings R1, R2, by finding the aforementioned optimum path for each of the scan lines L1, L1' of the sets.

Figure 12:
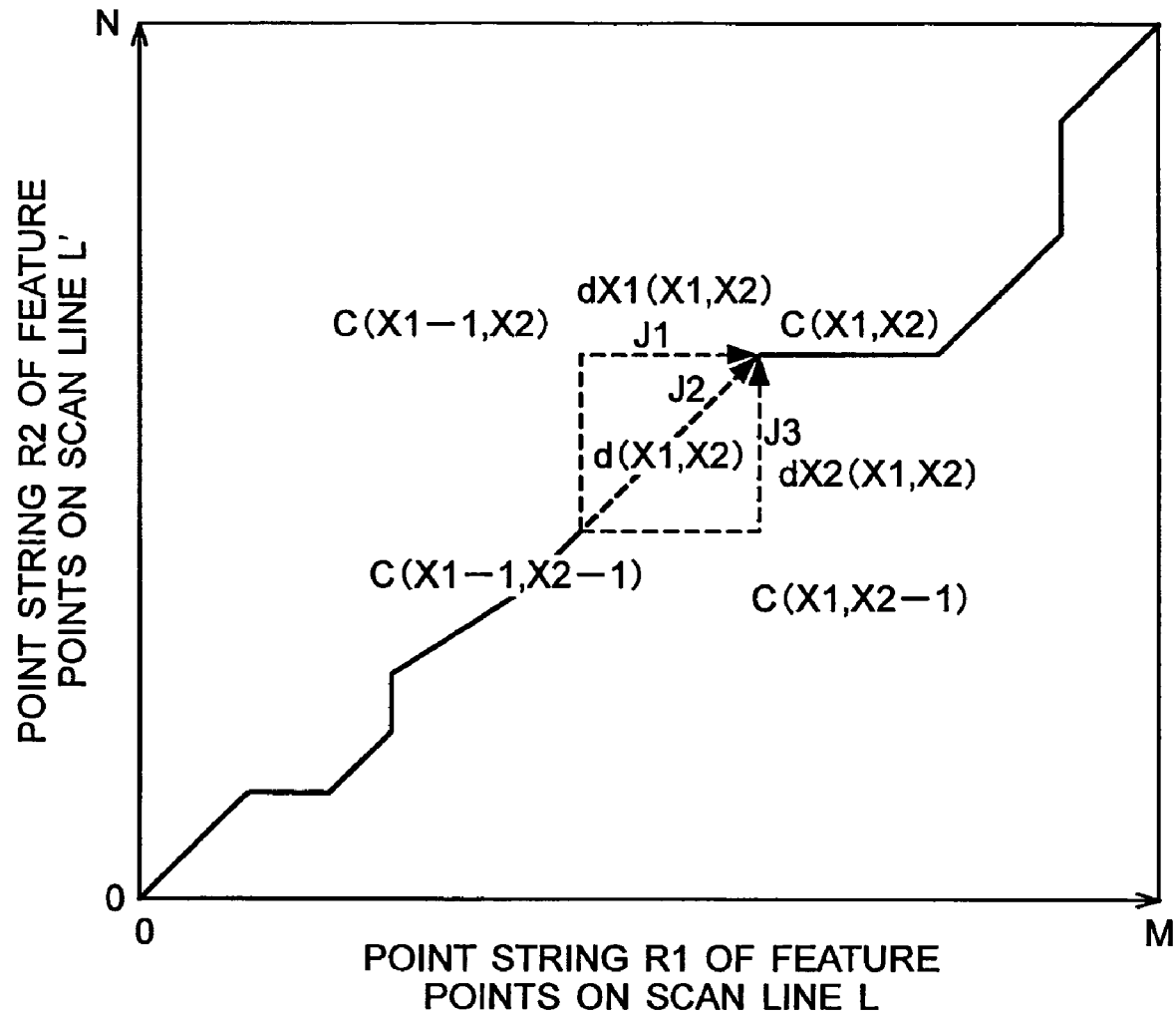
FIG. 12 shows a case of finding an optimum path until getting to an optional feature point (x,y) on scan lines L1, L1'.

FIG. 12 shows the case of finding an optimum path up to corresponding positions (x1,x2) as against optional feature points (x1,y) and (x2,y) on the scan lines L1, L1'.

In a graph shown in FIG. 12, the optimum path up to the corresponding positions (x1,x2) undergoes linear increase towards the upper right side, by shifting the corresponding positions (x1-1, x2-1), one each from left towards right and in the upward direction, respectively . Or, the optimum path up to the corresponding positions (x1,x2) undergoes linear increase in the horizontal direction from the corresponding position (x1-1, x2), as x2 is maintained and by shifting by one in the horizontal direction, whereby the optimum path undergoes vertical shifting from the corresponding position (x1-1, x2) in the horizontal direction. In addition, the optimum path up to the corresponding positions (x1,x2) undergoes linear increase in the vertical direction from the corresponding position (x1, x2-1), as x1 is maintained and by shifting by one in the vertical direction, whereby the optimum path undergoes vertical shifting from the corresponding position (x1, x2-1) in the vertical direction in the graph shown in FIG. 12.

That is, the optimum path up to the corresponding position (x1,x2) in the graph shown in FIG. 12 traverses a corresponding position lying on the left side (x1-1,x2), a corresponding position lying on the lower left side (x1-1,x2-1) or a corresponding position lying on the lower side (x1,x2-1). The matching unit 29 of the present invention determines through which of the corresponding positions (x1-1,x2), (x1-1,x2-1) and (x1,x2-1) the corresponding position (x1,x2) is reached, by sequentially finding the function now explained.

The matching unit 29 finds the matching cost function d(x1,x2) and dynamic occlusion cost functions dx1(x1,x2) and dx2(x1,x2), shown below, to find the above-described optimum path, depending on the respective functions as found. The matching cost function d(x1,x2) is a function showing the matching score of luminance components and chroma components between the positions of the respective pixels, the relation of correspondence of which is to be found. The occlusion cost function dx1(x1,x2) is a function representing the degree of hiding of the image Pe1a relative to the object image Pe2a in the object image, and the occlusion cost function dx2(x1,x2) is a function representing the degree of hiding of the image Pe2a relative to the object image Pe1a in the object image. These occlusion cost functions dx1(x1,x2), dx2(x1,x2) reflect the disparity between the respective images of the object.

First, the method for finding the matching cost function d(x1,x2) is explained.

As for d(x1,x2), which of the luminance components and the chroma components should be weighted is determined. This weighting is carried out, using a weighting coefficient α, in accordance with the following equation (1):

$$d_k(x1,x2) = \alpha \times dY_k(x1,x2) + (1-\alpha) dC_k(x1,x2) \quad (1)$$

where (x1,x2) indicates the corresponding position as against the pixel positions (x1,y) and (x2,y) in the images Pe1a and Pe2a, and k denotes in which number line of the images Pe1a, Pe2a x2 is located (that is, k=y). In this equation (1), $dY_k(x1,x2)$ denotes the absolute value of the difference between the luminance components of the coordinates (x1,y) and (x2,y) of the images Pe1a and Pe2a, and is defined by the following equation (2):

$$dY_k(x1,x2) = |Y1_k(x1,y) - Y2_k(x2,y)| \quad (2).$$

On the other hand, $dC_k(x1,x2)$ denotes the absolute value of the difference between the chrominance components of the images Pe1a and Pe2a, and is defined by the following equation (2):

$$dC_k(x1,x2) = |C1_k(x1,y) - C2_k(x2,y)| \quad (3).$$

That is, by setting a in the above equation (1) to a higher value, the component of the absolute value of the difference $dY_k(x1,x2)$ of the luminance component may be reflected to a larger extent and, by setting α in the above equation (1) to a smaller value, the component of the absolute value of the difference $dC_k(x1,x2)$ of the chroma component may be reflected to a lesser extent. By the way, an average value of the matching cost of the chroma component and the matching cost of the luminance components may be allocated for this α.

The d(x1,x2) may be found further by the following equation (4):

$$d(x1,x2) = (\Sigma d_k(x1,x2))/2K, \; k=-K, \ldots, K-1 \quad (4)$$

based on $d_k(x1,x2)$ as found from the equation (1).

This equation (4) indicates that d(x1,x2) may be found by taking an average value between the pixels lying above and below the scan line. By this equation (4), it is possible to reflect the correlation of the d(x1,x2) being found with the respective pixels lying above and below the scan line, thereby appreciably improving the precision in correspondence taking.

That is, the matching cost d(x1,x2), as found by the above method, is increased as the absolute value of the difference between the luminance components or the chroma components of the pixel positions (x1,y) and (x2,y) of the images Pe1a, Pe2a is increased. Stated differently, the matching cost is increased and decreased as the absolute value of the difference of the luminance or chroma components in the pixel positions (x1,y) and (x2,y) of the images Pe1a, Pe2a is increased and as the matching score of these components is increased, respectively. Thus, by this matching cost d(x1, x2), it is possible to discriminate the matching score of the luminance or chroma components in the pixel positions (x1,y) and (x2,y) of the pixels Pe1a, Pe2a.

The method for finding the occlusion cost functions dx1(x1,x2), dx2(x1,x2) is now explained.

These occlusion cost functions dx1(x1,x2), dx2(x1,x2) are generated based on the disparity information generated by the information generating unit 33. The smaller the distance from the cameras 1a, 2a to the user a as the object, that is, the larger the disparity, the higher becomes the probability of generation of the occlusion area. In such case, the matching unit 29 lowers the occlusion cost functions dx1(x1,x2), dx2(x1,x2) in order to cope with the situation. Conversely, the larger the distance from the cameras 1a, 2a to the user a as the object, that is, the smaller the disparity, the lower becomes the probability of generation of the occlusion area. In such case, the matching unit 29 raises the occlusion cost functions dx1(x1,x2), dx2(x1,x2) in order to cope with the situation.

The occlusion cost functions dx1(x1,x2), dx2(x1,x2) may be found based on the following equations (5) and (6):

$$dx1(x1,x2) = \beta \times d(x1,x2) + T0 \quad (5)$$

$$dx2(x1,x2) = \gamma \times d(x1,x2) + T1 \quad (6)$$

where d(x1,x2) is the matching cost and dynamically adjusts the occlusion cost for eliminating the variations in the intensity and in the color tint of the left and right images, while β and γ denote the rates of change of d(x1,x2) and may be experimentally found at the outset, and T0, T1 are initial occlusion cost constants and may similarly be found by experiments.

After finding these functions dx1(x1,x2), d(x1,x2) and dx2(x1,x2), the matching unit 29 sums the cumulative matching costs C(x1-1,x2), C(x1-1,x2-1) and C(x1, x2-1), in accordance with the following equations (7) to (9):

$$k1 = C(x1-1,x2) + dx1(x1,x2) \quad (7)$$

$$k2 = C(x1-1,x2-1) + d(x1,x2) \quad (8)$$

$$k3 = C(x1,x2-1) + dx2(x1,x2) \quad (9)$$

to find out the total costs k1, k2 and k3.

In the above equations, C(x1-1,x2), C(x1-1,x2-1) and C(x1, x2-1) denote the cumulative matching costs as found in the corresponding positions (x1-1,x2), (x1-1,x2-1) and (x1, x2-1). Meanwhile, the cumulative matching cost C(x1, x2) at the corresponding position (x1,x2) is set to the smallest one of k1, k2 and k3 as found, as indicated by the following equation (10):

$$C(x1,x2) = \min\{k1,k2,k3\} \quad (10).$$

The matching unit 29 finds the optimum path by selecting the smallest one of the total costs k1, k2 and k3 as found.

If the k1 becomes smallest, it indicates that the feature point as indicated in the image Pe1a has been shielded in the image Pe2a, as a result of the disparity becoming larger. In such case, the optimum path up to the corresponding position (x1,x2) is found by shifting in the horizontal direction from the corresponding position (x1-1,x2), as indicated by arrow J1 in FIG. 12.

If the k3 becomes smallest, it indicates that the feature point as indicated by the image Pe2a has been shielded in the image Pe1a, as a result of the disparity becoming larger. In such case, the optimum path up to the corresponding position (x1,x2) is found by shifting in the vertical direction from the corresponding position (x1,x2-1), as indicated by arrow J3 in FIG. 9.

If the k2 becomes smallest, it indicates that the matching score of the luminance components or chroma components at the pixel position (s,t) of the images Pe1a, Pe2a is high. In such case, the optimum path up to the corresponding position (x1,x2) is found by shifting by one each in the horizontal direction and in the vertical direction from the corresponding position (x1-1,x2-1), as indicated by arrow J2 in FIG. 12.

Figure 13A:
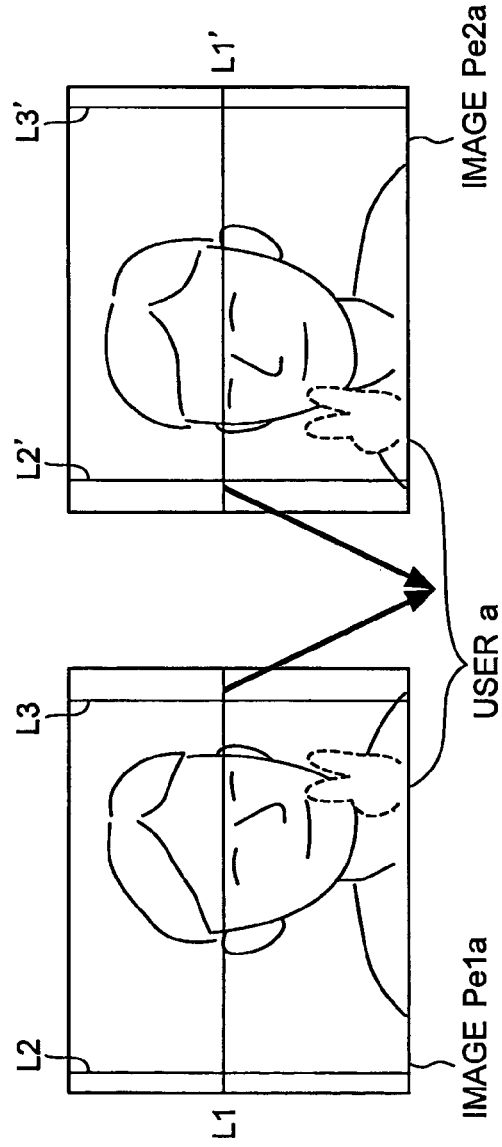
FIGS. 13(a) and 13(b) show the relation of correspondence exploiting the DP.
Figure 13B:
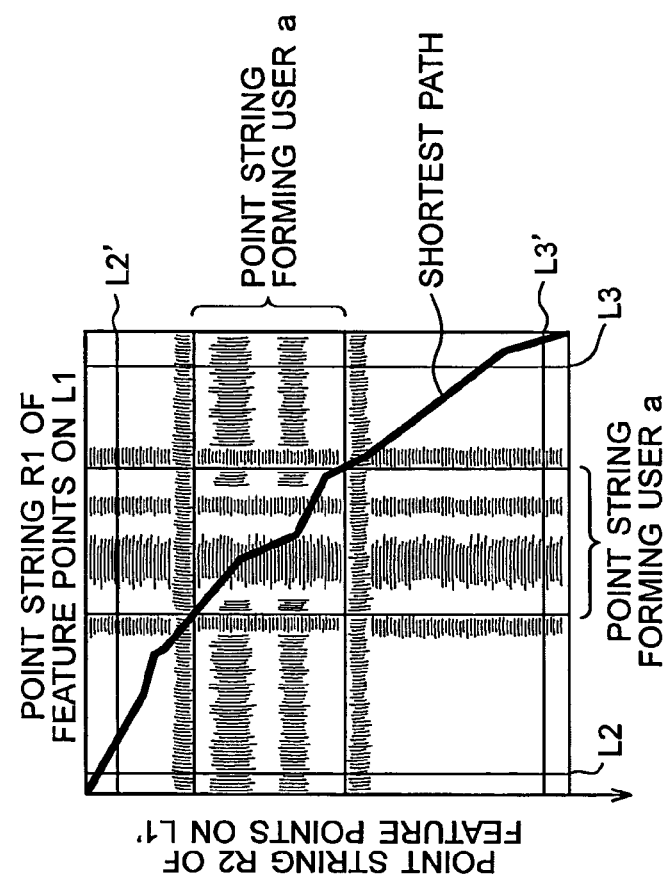

FIG. 13(b) shows the relation of correspondence of pixel components (luminance or chroma components) of the respective feature points on the scan lines L1, L1' in the images Pe1a and Pe2a shown in FIG. 13(a).

In the image Pe1a, shown in FIG. 13(a), there are shown recesses L2, L3 of wall sections on both sides of the user a and, in the image Pe2a, shown in FIG. 13(b), there are shown recesses L2', L3' of wall sections on both sides of the user a. These recesses are definitely shown as the differences in the pixel components in FIG. 13(b) in the form of lines. In similar manner, the pixel components making up the image of the user a are indicated definitely as the difference of the pixel components near the center of FIG. 13(b).

If, in this FIG. 13(b), the optimum path traverses the points of intersection of the same pixel components in the respective feature points on the scan lines L1, L1', it indicates that k2 becomes smallest, so that the high matching score of the luminance or chroma components in the pixel position (x1,y) and (x2,y) is prioritized. If conversely the optimum path traverses the points different from the points of intersection of the same pixel components in the respective feature points on the scan lines L1, L1', it indicates that k1 or k3 becomes smallest, so that the image Pe1a or the image Pe2a has been shielded by disparity.

In this manner, the optimum path up to the corresponding position (x1,x2) from one of the (x1-1,x2), (x1-1,x2-1) and (x1, x2-1) is found out. The fact that this optimum path is found indicates that an optimum relation of correspondence has been found depending on the matching score of the luminance and chroma components and on the disparity between the images Pe1a, Pe2a, such that the C(x1,x2), obtained from the above equation (10), may be defined as an optimum cumulative matching cost in finding the relation of correspondence from one pixel position to another. Since account may be taken of these cumulative matching costs C(x1,x2), in a cumulative fashion, when finding the optimum path up to the feature points lying on the upper, upper right and right sides in the graph, the taking of correspondence may be improved further in accuracy.

On the other hand, since the matching unit 29 calculates the functions dx1(x1,x2), d(x1,x2) and dx2(x1,x2), based on a totally different concept, there are occasions where an error is produced depending on the image pickup environment or on the object, in case the total costs k1 to k3 obtained are compared in a simple fashion on the basis of the equation (10). In such case, the difference between the functions dx1(x1,x2), d(x1,x2) and dx2(x1,x2) may be eliminated by optimizing β, γ, T0 and T1 in the equations (5) and (6) at the outset responsive to the image pickup environment or on the particular object.

Thus, in finding the relation of correspondence between the images Pe1a and Pe2a, the matching unit 29 in the image processing device 2a of the present invention determines which of the matching score and the disparity as discriminated should be prioritized. If it is the matching score that is prioritized, the same pixel positions on the horizontal lines are coordinated with each other, whereas, if it is the disparity that is to be prioritized, plural pixel positions on the same horizontal line are coordinated for one pixel position. This enables more correct correspondence taking even in case there exists an occlusion area. Moreover, by carrying out the correspondence taking, based on the above technique, the coordination may be improved in precision even for a repetitive pattern, such as both eyes of the user, or in a so-called non-feature point where changes in luminosity occur only rarely, such as wall sections. In addition, even in an area where brightness is changed depending on the viewing direction, such as a window, or in an area where regular reflection occurs, such as a nose of the user, correspondence can be taken relatively easily without being affected by the difference in luminance components or chroma components.

Meanwhile, with the matching unit 29 in the image processing device 2a of the present invention, it is of course possible to obtain the above favorable effect if the matching score and the disparity are discriminated and the above relation of correspondence has been found based on the so discriminated matching score and disparity.

The matching processing for the images Pe1b, Pe2b is carried out by a method similar to that described above. First, in a step ST5, the inversion and adjustment of the correspondence taking of the images Pe1b, Pe2b are carried out in a step ST5 and, in the next step ST6, the matching processing is carried out by a technique similar to that in the step ST4.

By separately carrying out the matching processing for the images Pe1a, Pe2a and that for the images Pe1b, Pe2b in the steps ST4 and ST6, the following favorable effect is obtained.

Figure 14:
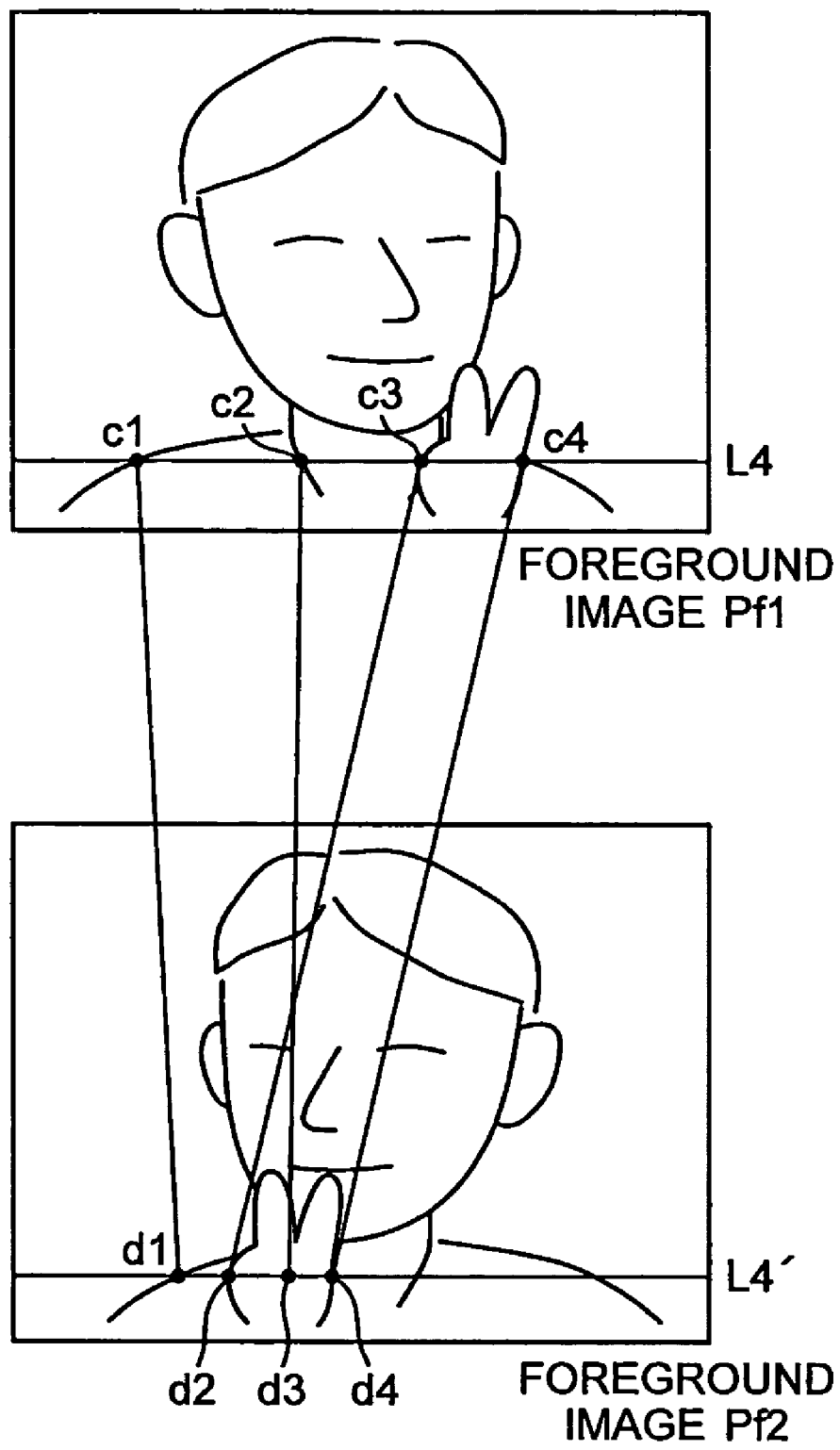
FIG. 14 illustrates a case of direct matching of a foreground image.

It is assumed that the foreground images Pf1, Pf2 prior to the image separating processing in the step ST3 are processed with matching in the matching unit 29. First, correspondence taking is carried out on the foreground images Pf1, Pf2, from one pixel position to another, as these images are associated with the object for imaging, as shown in FIG. 14. In taking the correspondence between pixels on a scan line L4 in the foreground image Pf1, as an image of the user a as an object, and those on a scan line L4' in the foreground image Pf2, equally as an image of the user a as an object, the feature points of the point string R1 on the scan line L4 are labeled {c1, c2, c3, c4}, looking from the left side, and those of the point string R2 on the scan line L4' are labeled {d1, d2, d3, d4}, again looking from the left side. If correspondence is taken of the feature points R1, R2 on the scan lines L4, L4' in relation to the object for imaging, the feature point d1 on the line L4' is associated with the feature point c1 in a 1:1 correspondence. However, the feature point c2 of the neck of the user a is associated with the feature point d3 on the line L4'. In similar manner, the feature points d2, d4 on L4' are associated with the feature points c3, c4 of the hand of the user a.

Figure 15:
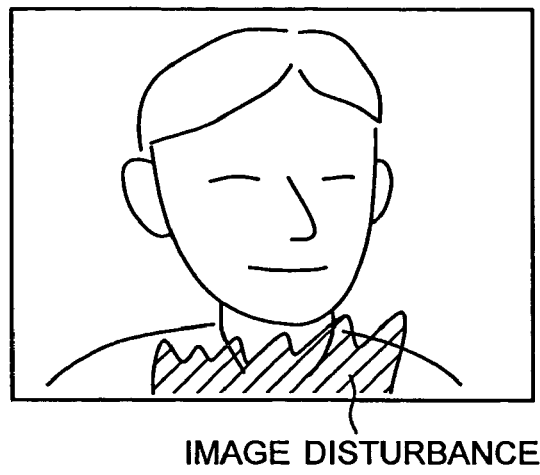
FIG. 15 illustrates disturbance in an image.

That is, with the foreground images Pf1, Pf2, obtained on capturing from different view points, the lines of correspondence taking between the feature points of image regions, having large disparity caused due to the distance between the object for imaging and the camera, intersect each other. The result is that image disturbances, such as shown in FIG. 15, are produced in a virtual view point image formulated in the virtual view point image generating unit 31 which will be explained subsequently.

With the image processing device 2, according to the present invention, the image regions are separated into images Pe1a, Pe2a and into images Pe1b, Pe2b, and matching processing is carried out separately on the images. Consequently, there is no risk of intersection of the lines of the correspondence taking between feature points of image regions, which undergo significant disparity, with the result that consequent image disturbances may be prevented from occurring.

In a step ST7, a virtual view point image region Ip1 is generated from the images Pe1a, Pe2a, already subjected to the matching processing in the step ST3.

Figure 16:
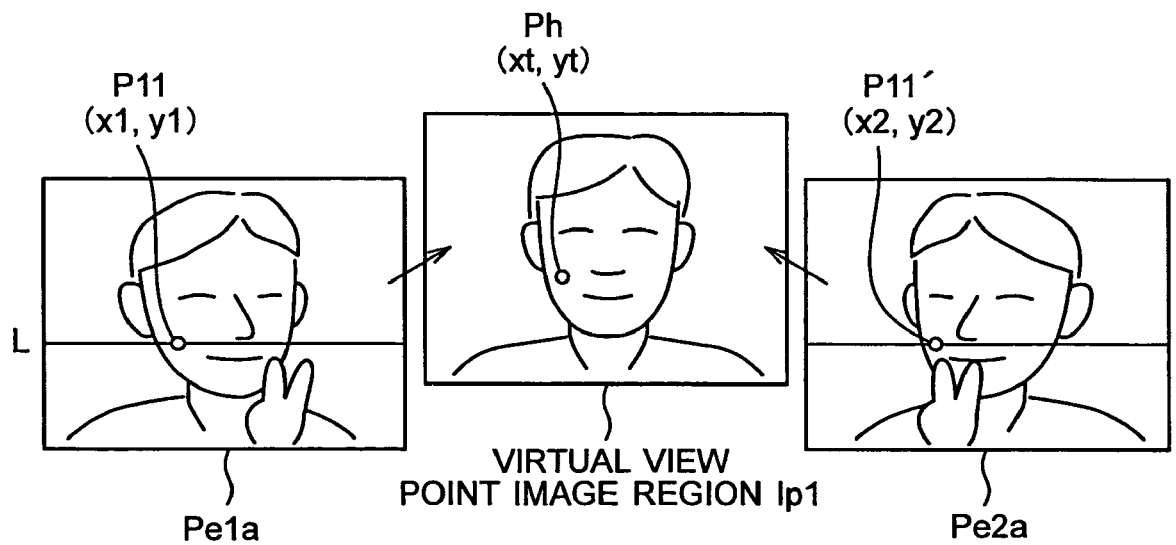
FIG. 16 illustrates a method of formulating a virtual view point image region.

Assume that a pixel position P11' in the image Pe2a has been specified as a point of correspondence for a pixel position P11 in the image Pe1a. In this case, the coordinate of the pixel position P11 is labeled (x1,y1), and that of the pixel position P11' is labeled (x2,y2), as shown in FIG. 16. The virtual view point image region generating unit 30 is able to determine the coordinate (xt,yt) of a pixel position on the virtual view point image region Ip1, associated with the pixel positions P11, P11', based on m (equal to or less than 1), as the relative position information, in accordance with the following equation (11):

$$(xt,yt)=(1-m)\times(x1,y1)+m\times(x2,y2) \qquad (11).$$

On the other hand, with luminance components J11, J11' in the pixel positions P11, P11', the luminance components Pt at a pixel position Ph on the virtual view point image region Ip1 may be determined by the following equation (12):

$$Pt=(1-m)\times J11+m\times J11' \qquad (12).$$

Hence, the virtual view point image region generating unit 30 is able to determine the coordinates and the luminance components of the respective pixels, making up the virtual view point image region Ip1, depending on m which is the relative position information.

It is noted that m becomes smaller the closer a virtual view point in a virtual camera to the camera 11a, and that m becomes larger the closer the virtual view point in the virtual camera to the camera 12a.

Consequently, the coordinate (xt,yt), determined based on the equation (11), is closer to the coordinate (x1,y1) of the pixel position P11, the closer the virtual view point to the camera 11a, while being closer to the coordinate (x2,y2) of the pixel position P12, the closer the virtual view point to the camera 12a. That is, the coordinate (xt,yt) may be determined freely, depending on the position of the virtual camera, and hence the position of the user a, demonstrated in the virtual view point image region Ip1, may be changed freely.

On the other hand, the closer the virtual view point to the camera 11a, the closer is the luminance component Pt, determined based on the equation (12), to the luminance component J11 of the pixel position P11, and the closer the virtual view point to the camera 11a, the closer is the luminance component Pt to the luminance component J11' of the pixel position P11'. That is, the luminance component of the pixel forming the image of the user a may be closer to the luminance component J11 or to the luminance component J11', depending on the position of the virtual camera.

In particular, since the image pickup directions of the cameras 11a and 12a differ from each other, the luminance components of the pixel position P11 on the image Pe1a differ from those of the pixel position P11' on the image Pe2a associated therewith. By linearly increasing or decreasing the luminance components Pt, depending on the value of m, as the relative position information, so that one of the two different luminance components is of a minimum value, with the other of the luminance components being of a maximum value, it is possible to determine the luminance components of the pixels of an image of the user a, displayed on the virtual view point image region Ip1, depending on the position of the virtual camera. Since the virtual view point image region Ip1 is generated based on the relation of correspondence, established in the matching unit 29, it is possible to reduce the deterioration of the resultant image further.

By sequentially determining the coordinates (xt,yt) at the pixel position Ph, and luminance components Pt thereof, as described above, the virtual view point image Ima generated faces to the front side, at all times, in distinction from the displayed images Pe1a, Pe2a of the user a, differing from each other as to the face orientation or the view line directions.

The virtual view point image region Ip1, thus generated, is sent to the virtual view point image generating unit 31.

Figure 17:
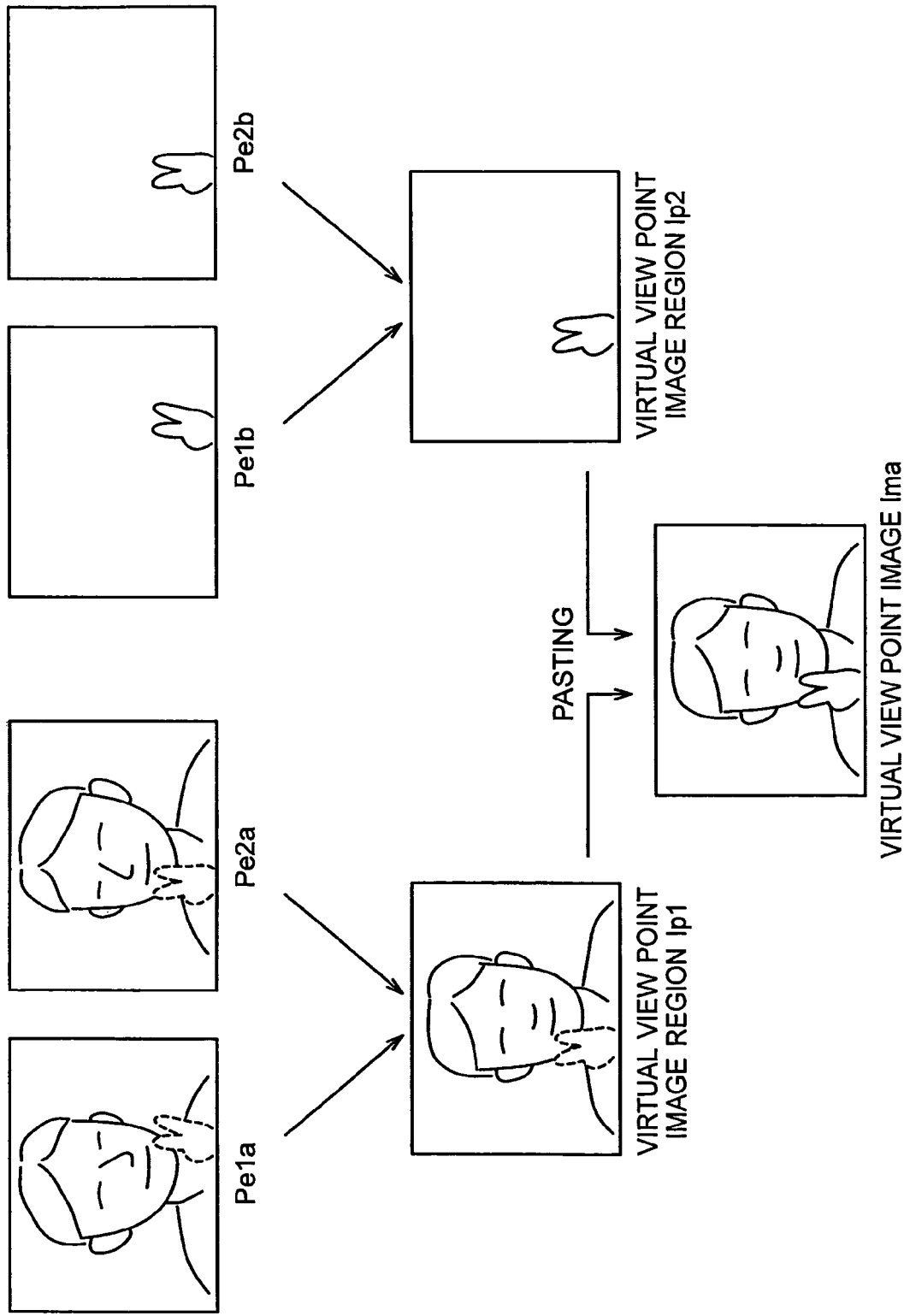
FIG. 17 illustrates a method of formulating a virtual view point image.

In a step ST8, a virtual view point image region Ip2 is generated, between the images Pe1b and Pb2b, by a method similar to the step ST7, as shown in FIG. 17.

Then, processing transfers to a step ST9, where the virtual view point image region Ip1, Ip2 are pasted to each other in the virtual view point image generating unit 31 to generate the virtual view point image Ima. The so generated virtual view point image Ima is sent out to the network 7, under control by the output controller 35. The virtual view point image Ima, sent to the counterpart side image processing device 2b, is demonstrated on a display 5b, under control by the image processing device 2b. The user b carries out a dialog with the user a, as the user b views the virtual view point image Ima of the user a, demonstrated on the display 5b. Since the face and the view line direction of the user a face to the front side, the user b feels as if he/she is viewing the image of the user captured by a virtual camera mounted near the center of the image surface. The same may be said of the user a, who may have a dialog with the user b, as the user a views the virtual view point image Imb of the user b as demonstrated on the display 5a. The user a may view the image of the user b facing to the front side. That is, with the present communication system 1, it is possible to realize visual communication in which the users having a dialog may direct their line of sight at all times to the counterpart users, thus achieving remote dialog with more realistic and on-the-spot feeling.

In particular, in the present communication system 1, it is sufficient that at least two cameras 11, 12 are mounted on both sides of the display 5, while it is unnecessary to extract the three-dimensional information of the object each time, and hence there is no risk of complicating the overall system.

Moreover, in the present communication system 1, there is no necessity of providing special devices, such as half mirrors, hologram screens or projectors, so that there may be provided a simplified and inexpensive system.

What is claimed is:

1. An image processing apparatus comprising:
   disparity detection means for detecting the disparity between images obtained on imaging an object by at least two cameras from different view points;
   image region separating means for separating said each image into plural image regions, based on the disparity detected by said disparity detection means;
   matching means for finding the relation of correspondence of said image regions, separated by said image separating means, as said image regions are coordinated with said object, from one pixel position on the same horizontal line to another; and
   image generating means for finding pixel positions, forming a virtual view point image, to be generated by a virtual camera, mounted imaginarily, and luminance components thereof, from pixel positions coordinated with one another by said matching means, and luminance components thereof;
   said matching means comparing the luminance components and chroma components, for each pixel position, the relation of correspondence of which is to be found, to calculate the matching score, said matching means finding the relation of correspondence, responsive to the matching score as calculated, to discriminate the disparity between the images of said object.

2. The image processing apparatus according to claim 1 further comprising
   image rectification means for finding a projective transformation matrix for projecting each image captured by each camera onto a virtual plane and for bringing the normal line direction of each image into coincidence with the normal line direction of said virtual plane, based on the projective transformation matrix as found.

3. The image processing apparatus according to claim 1 wherein said disparity detection means estimates the distance of said object to each camera to detect said disparity based on the estimated distance.

4. The image processing apparatus according to claim 3 wherein said image region separating means separates each image into plural image regions based on the distance to each camera of said object estimated by said disparity detection means.

5. The image processing apparatus according to claim 3 wherein said image generating means forms said virtual view point image so that the image at a closer distance to said camera will be at a more forward position.

6. The image processing apparatus according to claim 1 further comprising
   information generating means for generating the relative position information representing the relative position relationship to each camera of the optical center of said virtual camera;
   said image generating means finding pixel positions forming said virtual view point image, and luminance components thereof, based on the relative position information generated by said information generating means.

7. The image processing apparatus according to claim 1 wherein
   said matching means in finding the relation of correspondence between said image determines which of the matching score as calculated and the disparity is to be prioritized and wherein
   if the matching score is to be prioritized, correspondence is taken between the same pixel positions on said horizontal line and, if the disparity is to be prioritized, a plurality of pixel positions lying on the same horizontal line are coordinated with one pixel position.

8. The image processing apparatus according to claim 1 wherein
   said matching means weights luminance components or chroma components to be compared in calculating said matching score.

9. The image processing apparatus according to claim 1 wherein
   said matching means calculates said matching score as the relation of correspondence with respect to the luminance and the chroma components in each pixel position lying above and below said horizontal line.

10. An image processing method comprising:
    a disparity detection step of detecting the disparity between images obtained on imaging an object by at least two cameras from different view points;
    an image region separating step of separating each of said images into plural image regions, based on the disparity detected in said disparity detection step;
    a matching step of finding the relation of correspondence of said image regions, separated in said image region separating step, as said image regions are coordinated with said object, from one pixel position on the same horizontal line to another; and
    an image generating step of finding pixel positions, forming a virtual view point image, to be generated by a virtual camera, mounted imaginarily, and luminance components thereof, from pixel positions coordinated with one another in said matching step, and luminance components thereof;
    said matching step comparing the luminance components and chroma components, for each pixel position, the relation of correspondence of which is to be found, to calculate the matching score, said matching step finding the relation of correspondence, responsive to the matching score as calculated, to discriminate the disparity between the images of said object.

* * * * *